US008911509B2

(12) United States Patent
Tzikas et al.

(10) Patent No.: US 8,911,509 B2
(45) Date of Patent: Dec. 16, 2014

(54) MIXTURES OF FIBRE-REACTIVE DYES AND THEIR USE IN A METHOD FOR DI- OR TRICHROMATIC DYEING OR PRINTING

(75) Inventors: Athanassios Tzikas, Dornach (CH); Georg Roentgen, Freiburg (DE); Marco Casartelli, Allschwil (CH); Remo Codemo, Münchenstein (CH); Jean-Francois Landre, Riedisheim (FR)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/574,794

(22) PCT Filed: Jan. 13, 2011

(86) PCT No.: PCT/EP2011/050397
§ 371 (c)(1),
(2), (4) Date: Jul. 24, 2012

(87) PCT Pub. No.: WO2011/101185
PCT Pub. Date: Aug. 25, 2011

(65) Prior Publication Data
US 2012/0302486 A1  Nov. 29, 2012

(30) Foreign Application Priority Data

Feb. 18, 2010  (EP) .................................... 10153919

(51) Int. Cl.
*D06P 3/02* (2006.01)
*D06P 3/12* (2006.01)
*D06P 3/22* (2006.01)
*D06P 3/28* (2006.01)
*D06P 3/32* (2006.01)
*D06P 3/58* (2006.01)
*D06P 3/78* (2006.01)
*D06P 1/02* (2006.01)
*D06P 1/04* (2006.01)
*D06P 1/10* (2006.01)
*C09B 67/36* (2006.01)
*C09B 45/00* (2006.01)
*C09B 45/18* (2006.01)
*C09B 62/513* (2006.01)
*C09B 62/44* (2006.01)
*C09B 67/22* (2006.01)
*D06P 1/38* (2006.01)
*D06P 3/66* (2006.01)

(52) U.S. Cl.
CPC .......... *C09B 62/513* (2013.01); *C09B 62/4413* (2013.01); *C09B 62/4415* (2013.01); *C09B 67/0042* (2013.01); *C09B 67/0047* (2013.01); *C09B 67/0052* (2013.01); *D06P 1/38* (2013.01); *D06P 3/663* (2013.01); *Y10S 8/917* (2013.01); *Y10S 8/918* (2013.01); *Y10S 8/919* (2013.01); *Y10S 8/924* (2013.01); *Y10S 8/926* (2013.01)
USPC ................ 8/641; 8/636; 8/638; 8/639; 8/662; 8/664; 8/666; 8/667; 8/670; 8/680; 8/681; 8/685; 8/686; 8/688; 8/696; 8/404; 8/917; 8/918; 8/919; 8/924; 8/926

(58) Field of Classification Search
CPC ............... D06P 3/02; D06P 3/58; D06P 1/02; D06P 1/04; D06P 1/06; D06P 1/38; D06P 1/382; D06P 1/384; D06P 5/30; C09B 62/45; C09B 62/453; C09B 62/51; C09B 62/513; C09B 62/09; C09B 62/085; C09B 62/03; C09B 62/028; C09B 62/008; C09B 62/01; C09B 50/00
USPC ............. 8/636, 638, 641, 642, 662, 667, 669, 8/670, 673, 681, 682, 683, 684, 688, 916, 8/920, 636.638, 639, 664, 666, 680, 685, 8/686, 404, 917, 918, 919, 924, 926
See application file for complete search history.

(56) References Cited

U.S. PATENT DOCUMENTS

| 4,935,500 | A | * | 6/1990 | Omura et al. | 534/618 |
| 5,623,061 | A | * | 4/1997 | Jager et al. | 534/637 |
| 5,980,590 | A | * | 11/1999 | Russ et al. | 8/549 |
| 6,458,936 | B2 | * | 10/2002 | Gisler | 534/588 |
| 2004/0220072 | A1 | * | 11/2004 | Trinh et al. | 510/475 |
| 2007/0124875 | A1 |  | 6/2007 | Tzikas et al. | |

FOREIGN PATENT DOCUMENTS

| CN | 101 463 191 |  | 6/2009 |
| EP | 0094055 | * | 11/1983 |
| EP | 0 525 805 |  | 2/1993 |
| EP | 0 644 240 |  | 3/1995 |
| JP | 3 188167 |  | 8/1991 |
| JP | 8 259866 |  | 10/1996 |
| WO | 2004/069937 |  | 8/2004 |
| WO | WO2004/069937 | * | 8/2004 |
| WO | 2007/039573 |  | 4/2007 |

OTHER PUBLICATIONS

International Search Report regarding corresponding application No. PCT/EP2011/050397, dated May 11, 2011.

* cited by examiner

*Primary Examiner* — Lorna M Douyon
*Assistant Examiner* — Amina Khan

(57) ABSTRACT

Reactive dye mixtures comprising at least one red dyeing dye and at least one blue, yellow, orange or brown dyeing dye and their use in methods for the dichromatic or trichromatic dyeing or printing of cellulosic fiber materials are described. The reactive dye mixtures yield dyeings or prints having good reproducibility and good all-round fastness properties.

3 Claims, No Drawings

MIXTURES OF FIBRE-REACTIVE DYES AND THEIR USE IN A METHOD FOR DI- OR TRICHROMATIC DYEING OR PRINTING

CROSS REFERENCE TO RELATED APPLICATIONS

This application is the National Phase of International Application PCT/EP2011/050397 filed Jan. 13, 2012 which designated the U.S. and which claims priority to European (EP) Pat. App. No. 10153919.5 filed Feb. 18, 2010. The noted applications are incorporated herein by reference.

The present invention relates to mixtures of reactive dyes that are suitable for the dyeing or printing of nitrogen-containing or hydroxy-group-containing fibre materials and yield on such materials dyeings or prints having good reproducibility and good all-round fastness properties. The present invention relates also to a method for dichromatic or trichromatic dyeing or printing wherein the reactive dye mixtures according to the invention are used.

Over the past years, many countries have committed to improve the quality of the environment by saving natural resources and reducing the emission of substances which are harmful to the climate. Funds are provided by the governments to support the industry in achieving these goals. The consumer is asking for environmentally friendly textile products which are produced in accordance with highest ecological standards. Brands and retailers are conveying these demands into real requirements and textile manufacturers are continuously improving their production excellence by investing in modern equipment and selecting environmental friendly chemical substances.

As a result, there is a huge demand for novel reactive dye mixtures that are suitable for the reproducible, dichromatic and trichromatic dyeing and printing of fibre materials which fulfill highest ecological and economical requirements while still providing dyeings of the desired colour shades with good fastness properties, such as wash and water fastness and perspiration fastness. Suitable reactive dyes should provide a unique combinability and a low sensitivity to various dyeing parameters. Furthermore, they should have sufficient substantivity and at the same time have good ease of washing off of unfixed dye. They should also have a good tinctorial yield and high reactivity, the objective being to provide especially dyeings having high degrees of fixing.

The present invention is therefore based on the problem of providing new mixtures of reactive dyes that are suitable especially for the reproducible, dichromatic and trichromatic dyeing and printing of fibre materials in the desired colour shades and fulfill the above indicated requirements to the highest possible extent.

The present invention accordingly relates to dye mixtures comprising at least one red dyeing dye, for example one, two or three dyes, preferably one dye of the formula

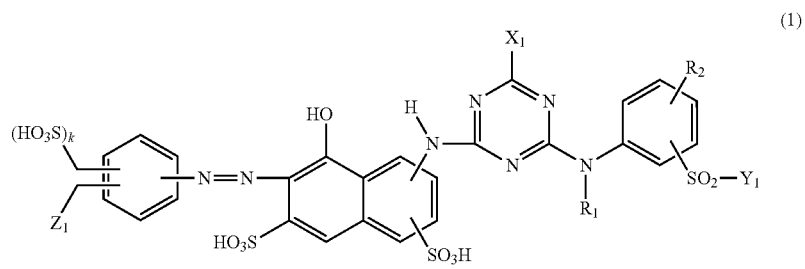

(1)

and at least one blue, navy, yellow, orange or brown dyeing dye, for example one, two or three dyes, from the group of the formulae

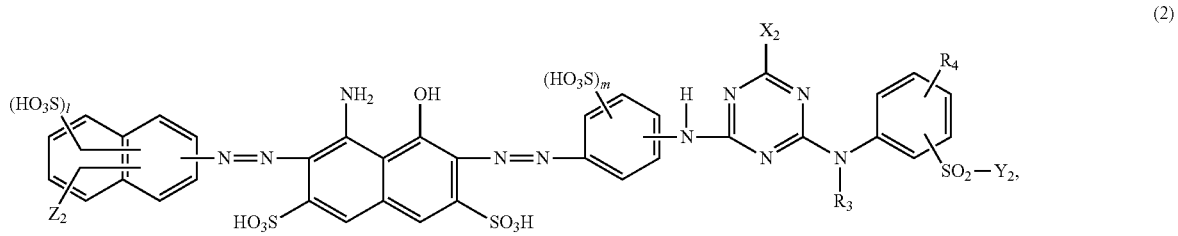

(2)

-continued

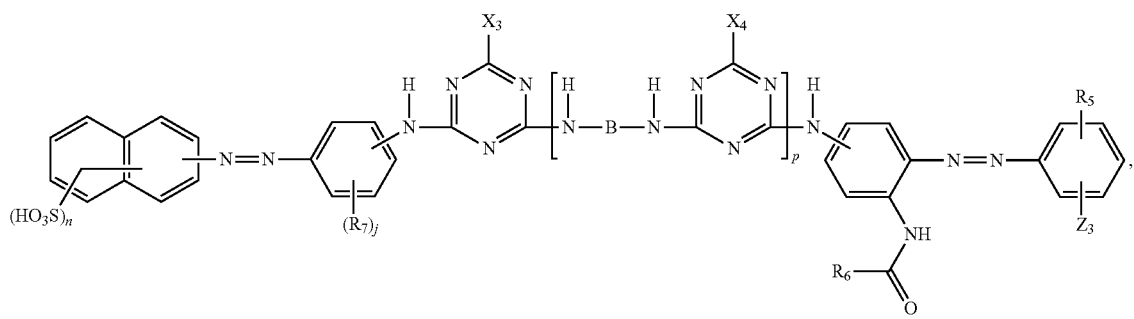
(3)

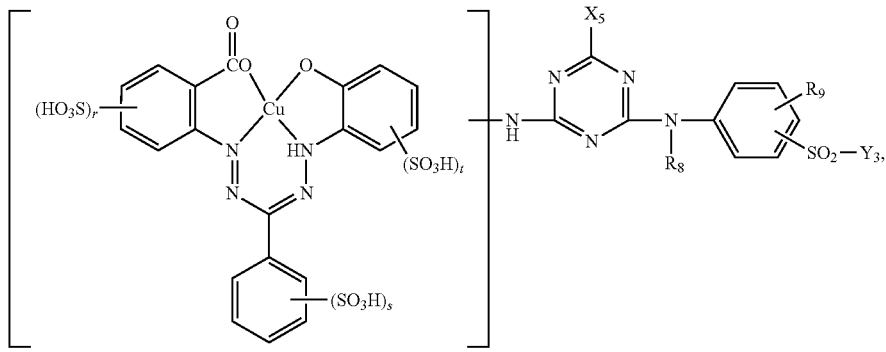
(4)

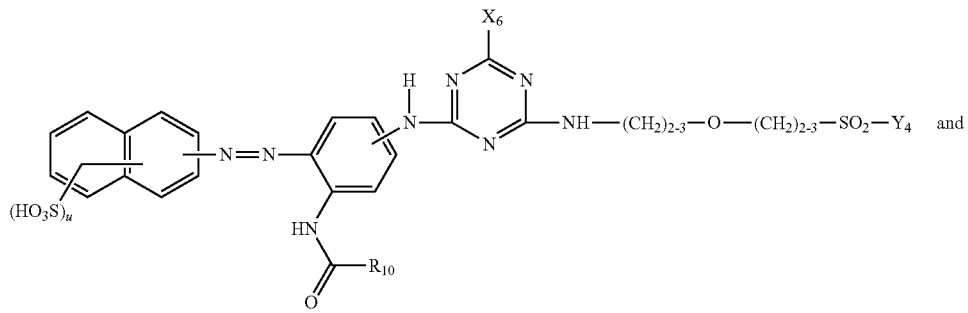
(5)

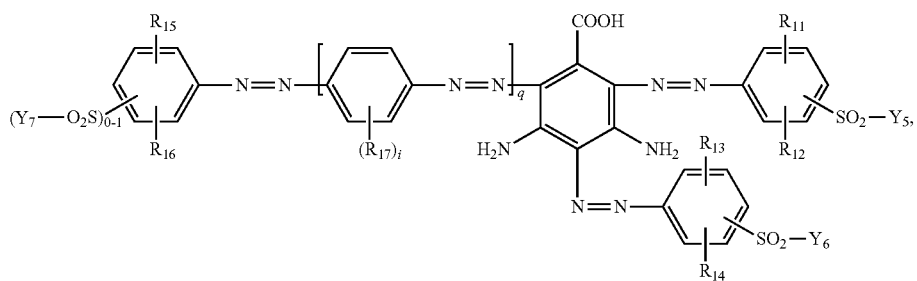
(6)

wherein

B is an aliphatic bridging member, $R_1$, $R_3$ and $R_8$ are each independently of the others hydrogen or $C_1$-$C_4$alkyl, $R_2$, $R_4$, $R_5$, $R_9$, $R_{11}$, $R_{12}$, $R_{13}$, $R_{14}$, $R_{15}$ and $R_{16}$ are each independently of the others hydrogen, $C_1$-$C_4$alkyl, $C_1$-$C_4$alkoxy or sulfo, $R_6$ and $R_{10}$ are each independently of the other amino or $C_1$-$C_4$alkyl, $(R_7)_j$ denotes j identical or different substituents selected from the group $C_2$-$C_4$alkanoylamino, ureido, $C_1$-$C_4$alkyl and $C_1$-$C_4$alkoxy, $(R_{17})_i$ denotes i identical or different substituents selected from the group $C_2$-$C_4$alkanoylamino, ureido, sulfo, $C_1$-$C_4$alkyl and $C_1$-$C_4$alkoxy, $X_1$, $X_2$, $X_3$, $X_4$, $X_5$ and $X_6$ are each independently of the others halogen, 3-carboxypyridin-1-yl or 3-carbamoylpyridin-1-yl, $Z_1$, $Z_2$ and $Z_3$ are each independently of the others a fibre-reactive group of the formula $$—SO_2—Y_8, \qquad (7a)$$

or $$—NH—CO—(CH_2)_{2\text{-}3}—SO_2—Y_9, \qquad (7b),$$

$Y_1, Y_2, Y_3, Y_4, Y_5, Y_6, Y_7, Y_8$ and $Y_9$ are each independently of the others vinyl or a radical —$CH_2$—$CH_2$—U and U is a group removable under alkaline conditions, i, j, k and l are each independently of the other the number 0, 1 or 2, m is the number 1 or 2, n and u are each independently of the other the number 1, 2 or 3, p and q are each independently of the other the number 0 or 1, r and s are each independently of the other the number 0 or 1, and t is the number 0, 1 or 2, and the sum of r, s and t is 2 or 3.

The dyes of the formulae (1), (2), (3), (4), (5) and (6) are fiber reactive, i.e. they contain at least one fibre-reactive substituent, preferably, at least two fibre-reactive substituents. The dyes of the formulae (1) and (2), the dye of the formula (3), wherein p is the number 1, and some embodiments of the dye of the formula (6) contain three fibre-reactive substituents.

The dyes of the formulae (1), (2), (3), (4), (5) and (6) in the dye mixtures according to the invention contain one or more than one sulfo groups or carboxy groups, which are each present either in free acid form or, preferably, in salt form. Suitable salts are, for example, alkali metal, alkaline earth metal or ammonium salts, salts of an organic amine, or mixtures thereof. Examples that may be mentioned are sodium, lithium, potassium or ammonium salts, or in the form of a salt of an organic amine, for example, a mono-, di- or tri-ethanolamine salt or mixed Na/Li or Na/Li/$NH_4$ salts.

Preferably, the dye mixtures according to the invention comprise at least one dye of the formula (1), at least one dye from the group of the formulae (2) and (4) and at least one dye from the group of the formulae (3), (5) and (6).

In a particular preferred embodiment of the present invention the dye mixtures comprise at least one dye of the formula (1), at least one dye of the formula (2) and at least one dye of the formula (3).

In another particular preferred embodiment of the present invention the dye mixtures comprise at least one dye of the formula (1), at least one dye of the formula (3) and at least one dye of the formula (4).

The broken lines in the formulae (1), (2), (3) and (5) indicate that the corresponding diazo components each independently of the others denote either a benzene radical or a naphthalene radical. In one embodiment, the diazo component of the dye of the formula (1) is a naphthalene radical. In a preferred embodiment, the diazo component of the dye of the formula (2) is a benzene radical. In a preferred embodiment, the diazo component of the dye of the formula (3) is a naphthalene radical. In a preferred embodiment, the diazo component of the dye of the formula (5) is a naphthalene radical.

B is, for example, straight-chain or branched $C_2$-$C_{12}$alkylene which is unsubstituted or substituted by hydroxy, $C_1$-$C_4$alkoxy, sulfato or sulfo and which may be interrupted once or more than once by —O— or —NR*—, preferably, —O—, R* being hydrogen or $C_1$-$C_4$alkyl, preferably, hydrogen, methyl or ethyl and, especially, hydrogen.

Preferably, B is straight-chain or branched $C_2$-$C_6$alkylene which is unsubstituted or substituted by hydroxy, sulfo or sulfato, especially hydroxy, and more especially is straight-chain or branched $C_2$-$C_6$alkylene which is unsubstituted. Examples of preferred radicals B are 1,2-ethylene, 1,2-propylene, 1,3-propylene, 2-hydroxy-1,3-propylene, 1,4-butylene, 2,2-dimethyl-1,3-propylene, 2-methyl-1,5-pentylene, 1,6-hexylene.

Of special interest as bridging members B are those $C_2$-$C_6$alkylene radicals which correspond to the formula —$CH_2$—CH($R_{18}$)— or —($R_{18}$)CH—$CH_2$—, wherein $R_{18}$ is $C_1$-$C_4$alkyl, especially, methyl. Of very special importance for B is the meaning 1,2-propylene.

As $C_1$-$C_4$alkyl there come into consideration for $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$ and $R_{17}$ each independently of the others e.g. methyl, ethyl, propyl, isopropyl, n-butyl, sec-butyl, tert-butyl and isobutyl, preferably, methyl and ethyl. Especially, $R_1$, $R_3$ and $R_8$ in the meaning of $C_1$-$C_4$alkyl are ethyl. Especially, $R_2$, $R_4$, $R_5$, $R_7$, $R_9$, $R_{11}$, $R_{12}$, $R_{13}$, $R_{14}$, $R_{15}$, $R_{16}$ and $R_{17}$ in the meaning of $C_1$-$C_4$alkyl are methyl. Especially, $R_6$ and $R_{10}$ in the meaning of $C_1$-$C_4$alkyl are methyl.

As $C_1$-$C_4$alkoxy there come into consideration for $R_2$, $R_4$, $R_5$, $R_7$, $R_9$, $R_{11}$, $R_{12}$, $R_{13}$, $R_{14}$, $R_{15}$, $R_{16}$ and $R_{17}$ each independently of the others e.g. methoxy, ethoxy, n-propoxy, isopropoxy, n-butoxy and isobutoxy, preferably, methoxy and ethoxy and, especially, methoxy.

As $C_1$-$C_4$alkanoylamino there come into consideration for $R_7$ and $R_{17}$ each independently of the other, e.g. acetylamino, propionylamino or butyrylamino, preferably, acetylamino.

Preferably, $R_1$, $R_3$ and $R_8$ are each independently of the others hydrogen, methyl or ethyl, especially, ethyl.

Preferably, $R_2$, $R_4$, $R_5$, $R_9$, $R_{11}$, $R_{12}$, $R_{13}$, $R_{14}$, $R_{15}$ and $R_{16}$ are each independently of the others hydrogen, methyl, methoxy or sulfo, especially hydrogen or sulfo. More especially, $R_2$, $R_4$ and $R_9$ are hydrogen. More especially, $R_5$ is sulfo. More especially, $R_{11}$, $R_{13}$, and $R_{15}$ are hydrogen and one substituent from the group of $R_{12}$, $R_{14}$, and $R_{16}$ is sulfo and the other substituents from the group of $R_{12}$, $R_{14}$, and $R_{16}$ are hydrogen, methyl or methoxy, in particular, hydrogen.

Preferably, $R_6$ and $R_{10}$ are each independently of the other amino or methyl, especially, amino.

In one embodiment $(R_7)_j$ denotes 1 or 2 identical or different substituents selected from the group methyl, methoxy and sulfo.

In another embodiment $(R_7)_j$ denotes acetylamino, propionylamino or ureido, wherein j is the number 1.

In one embodiment $(R_{17})_i$ denotes 1 or 2 identical or different substituents selected from the group methyl, methoxy and sulfo.

In another embodiment $(R_{17})_i$ denotes acetylamino, propionylamino or ureido, wherein i is the number 1.

Preferably $(R_7)_j$ denotes ureido, wherein j is the number 1.

Preferably $(R_{17})_i$ denotes 1 or 2 identical or different substituents selected from the group methoxy and sulfo, especially 2 different substituents, one being methoxy and the other one being sulfo.

As halogen there come into consideration for $X_1$, $X_2$, $X_3$, $X_4$, $X_5$ and $X_6$ each independently of the others e.g. fluorine, chlorine or bromine, preferably, fluorine or chlorine.

Preferably, $X_1$, $X_2$, $X_3$, $X_4$, $X_5$ and $X_6$ are halogen.

Especially, $X_1$ and $X_2$ are chlorine.

The radicals $X_3$ and $X_4$ are identical or not identical. In a particular embodiment of the present invention one of the radicals $X_3$ and $X_4$ is fluorine and the other of the radicals $X_3$ and $X_4$ is chlorine. Preferably, the radicals $X_3$ and $X_4$ are identical and denote fluorine.

Especially, $X_5$ and $X_6$ are fluorine.

As leaving group U there comes into consideration, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$-C$_4$alkyl or —OSO$_2$—N(C$_1$-C$_4$alkyl)$_2$. U is preferably a group of the formula —Cl, —OSO$_3$H, —SSO$_3$H, —OCO—CH$_3$, —OCO—C$_6$H$_5$ or —OPO$_3$H$_2$, especially —Cl or —OSO$_3$H.

Examples of suitable radicals $Y_1$, $Y_2$, $Y_3$, $Y_4$, $Y_5$, $Y_6$, $Y_7$, $Y_8$ and $Y_9$ are accordingly vinyl, β-bromo- or β-chloro-ethyl, β-acetoxyethyl, β-benzoyloxyethyl, β-phosphatoethyl, β-sulfatoethyl and β-thiosulfatoethyl. Z is preferably vinyl, β-chloroethyl or β-sulfatoethyl and especially β-sulfatoethyl or vinyl.

Preferably, k and l are each independently of the other the number 0 or 1.

Preferably, m is the number 1.

Preferably, n and u are each independently of the other the number 2 or 3, especially the number 3.

Preferably, p is the number 1.

Preferably, t is the number 1 or 2, especially, the number 1

Preferably, r and s are the number 1.

Preference is given to dye mixtures, wherein the dye of formula (1) corresponds to a dye of the formula

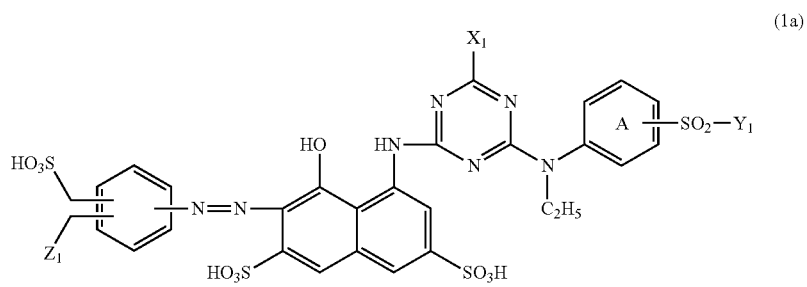

(1a)

wherein $X_1$ is fluorine or chlorine, $Z_1$ is a fibre-reactive group of the formula (7a) or (7b), preferably, of the formula (7a), and $Y_1$, $Y_8$ and $Y_9$ each independently of the others have the meanings and preferred meanings defined above, preferably, β-sulfatoethyl or vinyl. Preferably, the radical —SO$_2$—Y$_1$ is located in the meta-position of the phenyl ring A.

Preference is also given to dye mixtures, wherein the dye of formula (2) corresponds to a dye of the formula

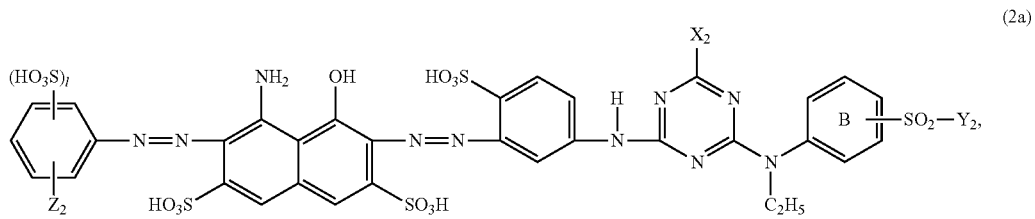

(2a)

wherein $X_2$ is fluorine or chlorine, $Z_2$ is a fibre-reactive group of the formula (7a), $Y_2$ and $Y_8$ each independently of the other have the meanings and preferred meanings defined above, preferably, β-sulfatoethyl or vinyl, and l is the number 0 or 1, preferably, the number 1. Preferably, the radical —$SO_2$—$Y_2$ is located in the meta-position of the phenyl ring B.

Preference is also given to dye mixtures, wherein the dye of formula (3) corresponds to a dye of the formula wherein $X_5$ is fluorine or chlorine, preferably fluorine, $Y_3$ has the meaning and preferred meaning defined above, preferably, β-sulfatoethyl or vinyl, and t is the number 1 or 2, especially, the number 1, and r is the number 0 or 1, and s is the number 1. Preferably, the radical —$SO_2$—$Y_3$ is located in the meta-position of the phenyl ring C.

Preference is also given to dye mixtures, wherein the dye of formula (5) corresponds to a dye of the formula

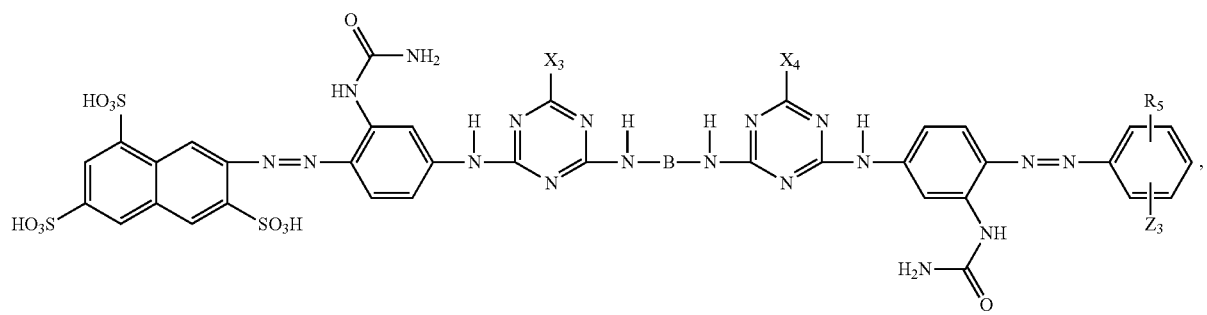

(3a)

wherein

B has the meaning and preferred meaning defined above, preferably, is a radical of the formula —$CH_2$—$CH(R_{18})$— or —$(R_{18})CH$—$CH_2$—, wherein $R_{18}$ is $C_1$-$C_4$alkyl, especially methyl, one of the radicals $X_3$ and $X_4$ is fluorine and the other of the radicals $X_3$ and $X_4$ is chlorine, preferably, the radicals $X_3$ and $X_4$ are identical and denote fluorine, $Z_3$ is a fibre-reactive group of the formula (7a) or (7b), preferably, of the formula (7a), and $Y_8$ and $Y_9$ each independently of the others have the meanings and preferred meanings defined above, preferably, β-sulfatoethyl or vinyl, and $R_5$ is hydrogen or sulfo, preferably, sulfo.

Preference is also given to dye mixtures, wherein the dye of formula (4) corresponds to a dye of the formula

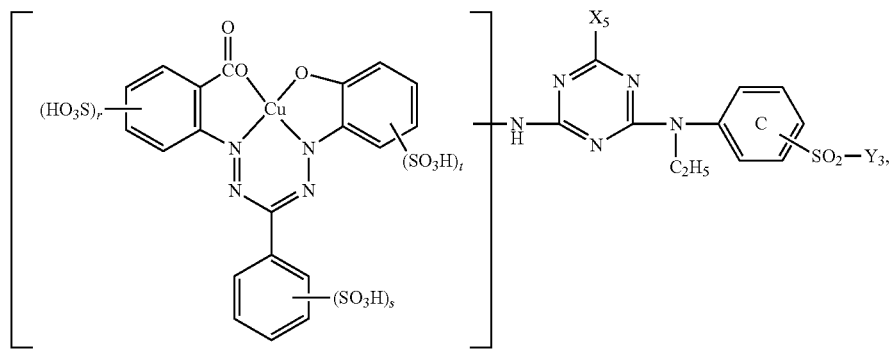

(4a)

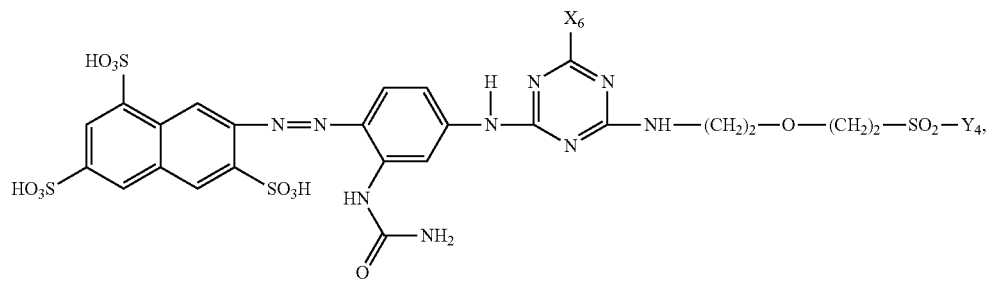

(5a)

wherein $X_6$ is fluorine or chlorine, preferably fluorine, and $Y_4$ has the meaning and preferred meaning defined above, preferably, β-sulfatoethyl, β-chlorooethyl or vinyl.

Preference is also given to dye mixtures, wherein the dye of formula (6) corresponds to a dye of the formula

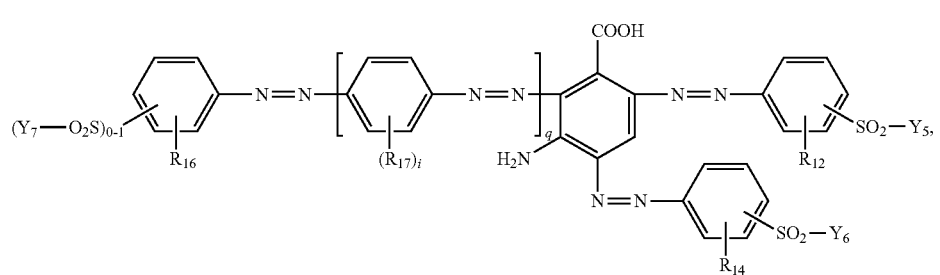

(6a)

wherein one substituent from the group of $R_{12}$, $R_{14}$, and $R_{16}$ is sulfo and the other substituents from the group of $R_{12}$, $R_{14}$, and $R_{16}$ are hydrogen, methyl or methoxy, in particular, hydrogen, $(R_{17})_i$ denotes 1 or 2 identical or different substituents selected from the group methoxy or sulfo, especially, 2 different substituents, one being methoxy and the other one being sulfo, $Y_5$, $Y_6$ and $Y_7$ each independently of the others have the meanings and preferred meanings defined above, preferably, β-sulfatoethyl or vinyl, and q is the number 0 or 1, preferably, the number 0.

The dye of formula (1) is, for example, a dye of the formula

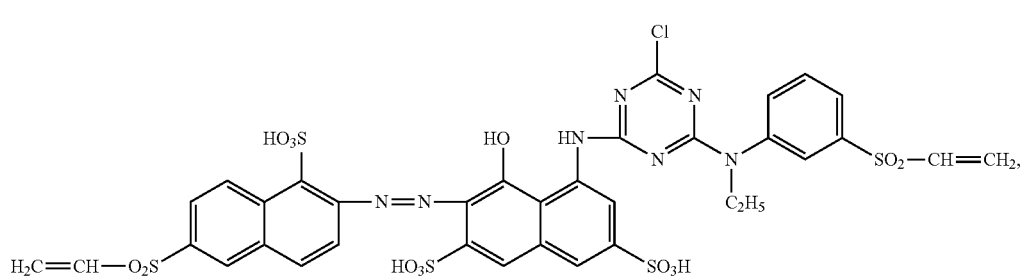

(101)

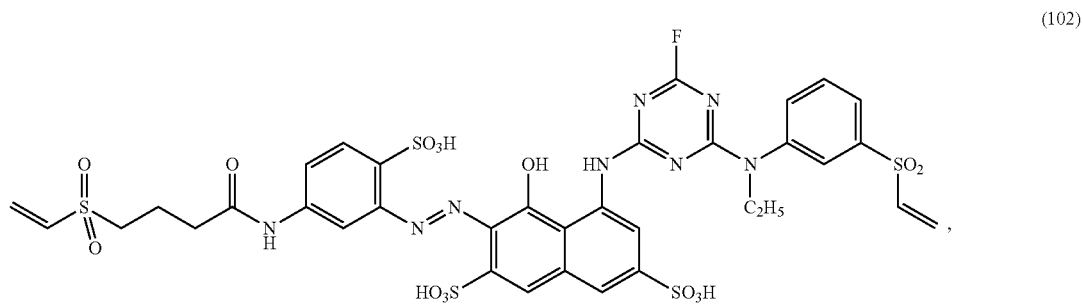

(102)

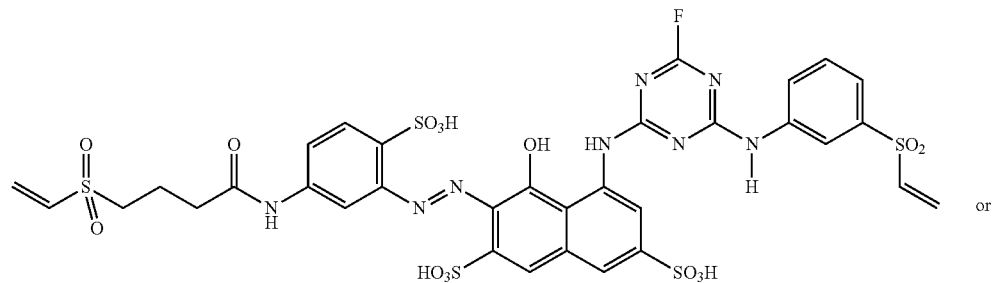
(103)
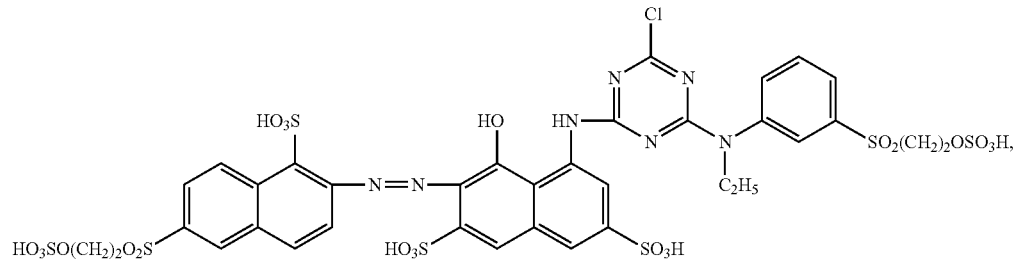
(104)
preferably, a dye of the formula (101) or (104).
The dye of formula (2) is, for example, a dye of the formula
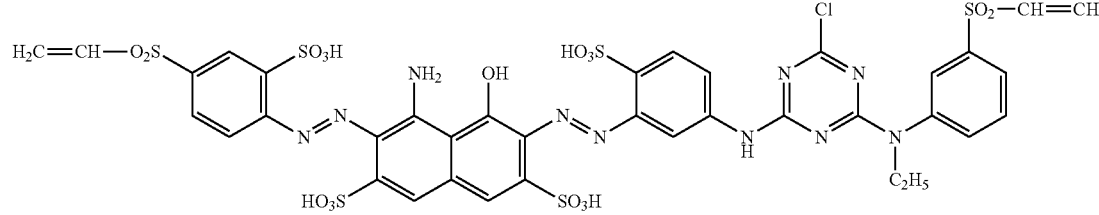
(201)
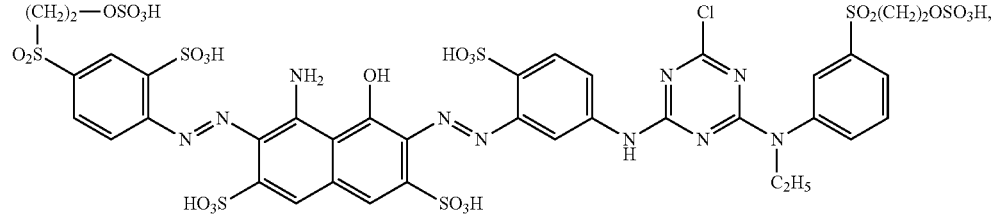
(202)
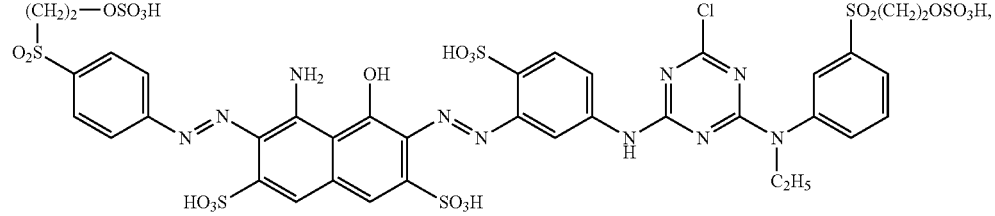
(203)
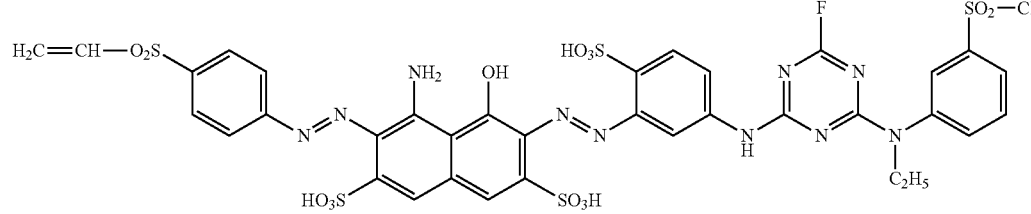
(204)

-continued
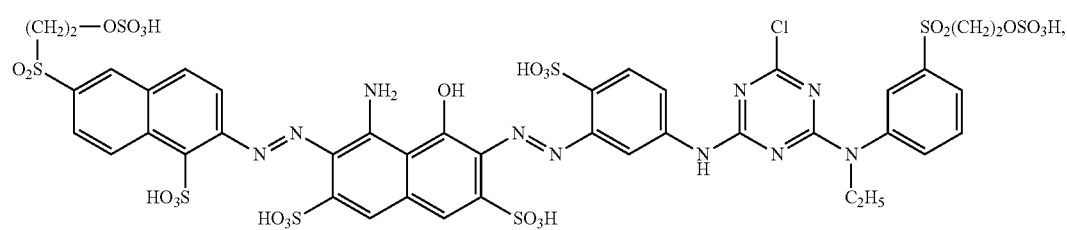
(205)
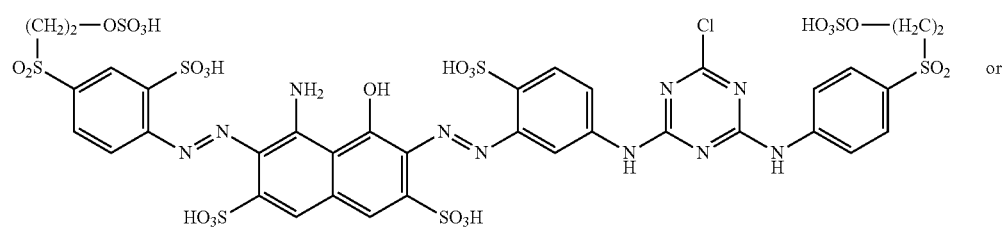
(206)
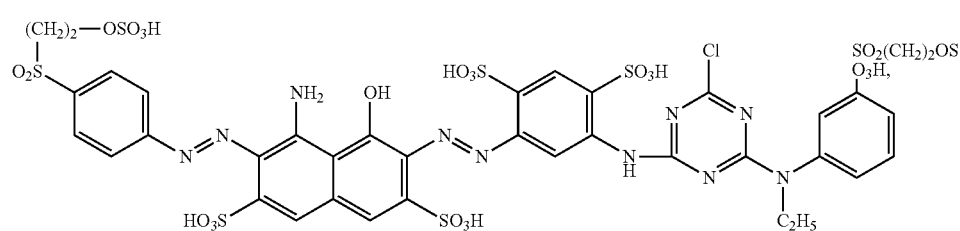
(206)
preferably, a dye of the formula (201) or (202).
The dye of formula (3) is, for example, a dye of the formula
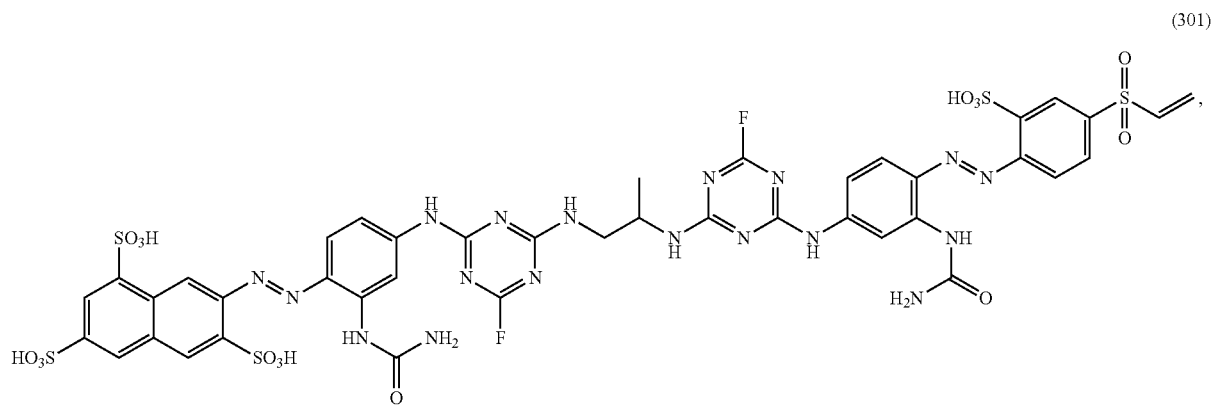
(301)
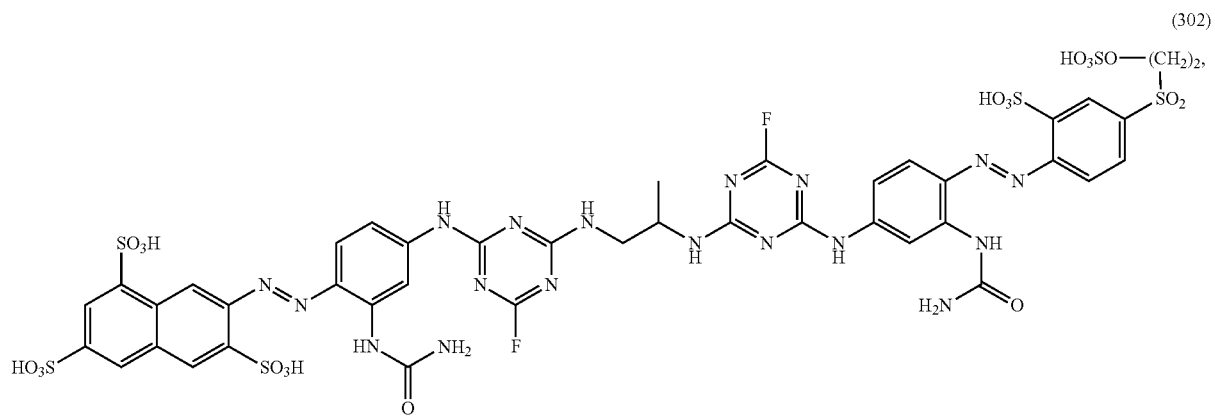
(302)

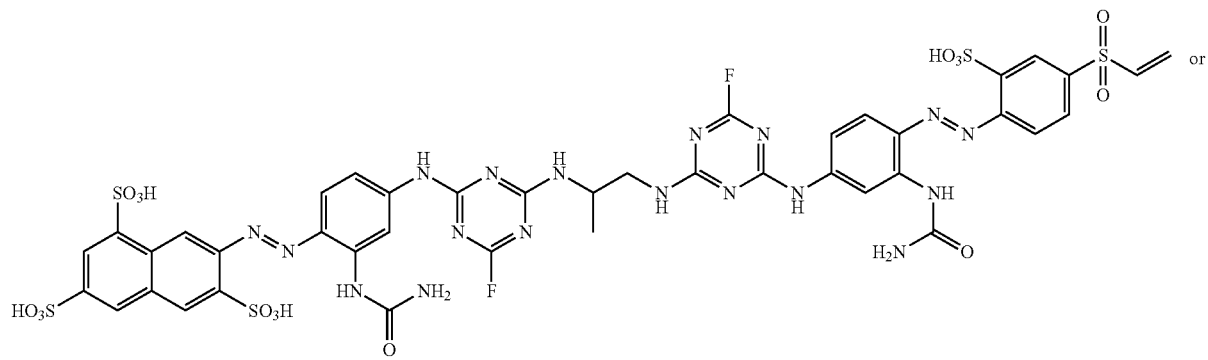
(303)
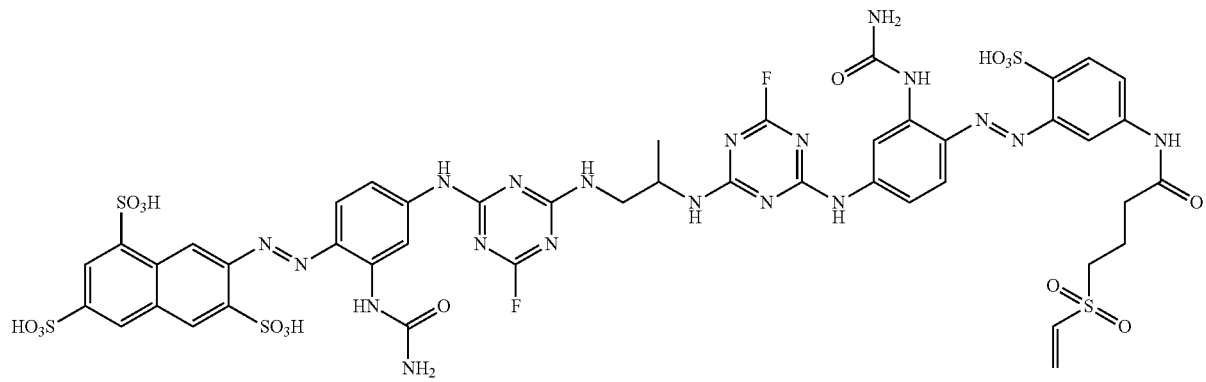
(304)
preferably, a dye of the formula (301) or (302).
The dye of formula (4) is, for example, a dye of the formula
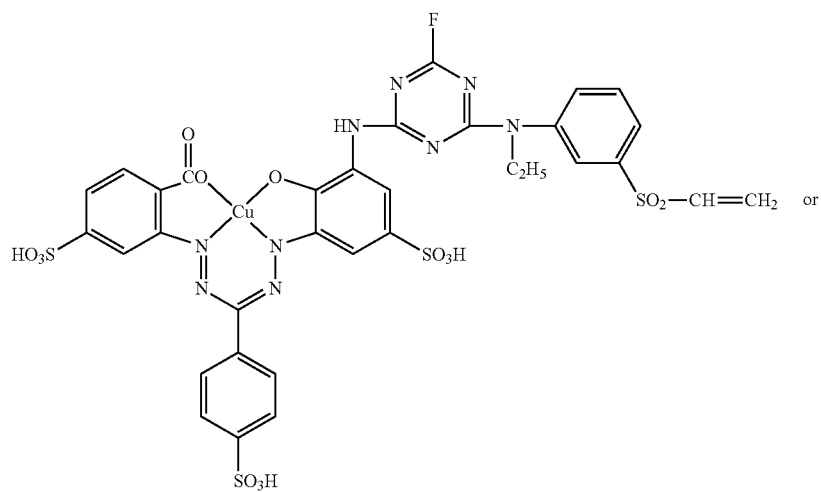
(401)

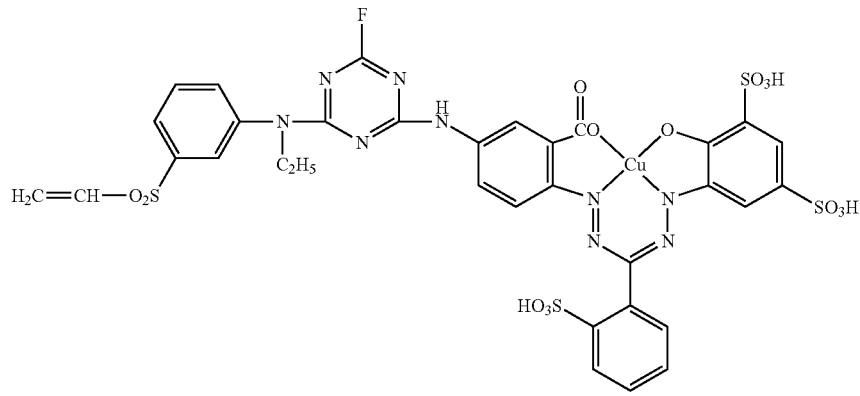
(402)
preferably, a dye of the formula (401).
The dye of formula (5) is, for example, a dye of the formula
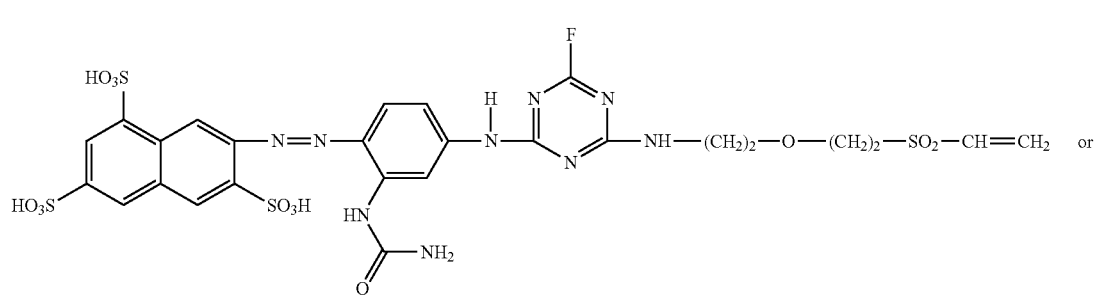
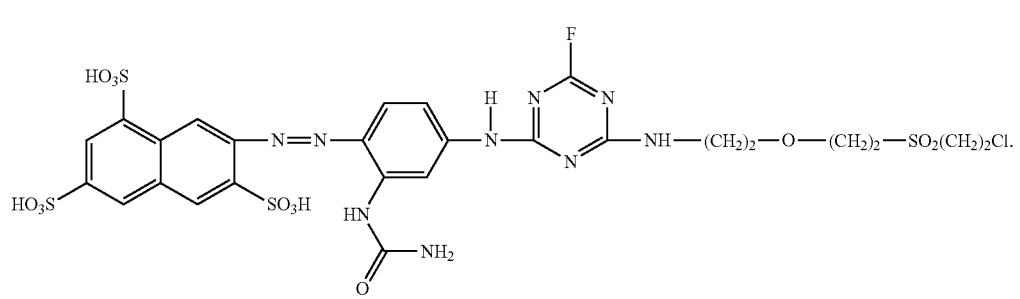
The dye of formula (6) is, for a example, a dye of the formula
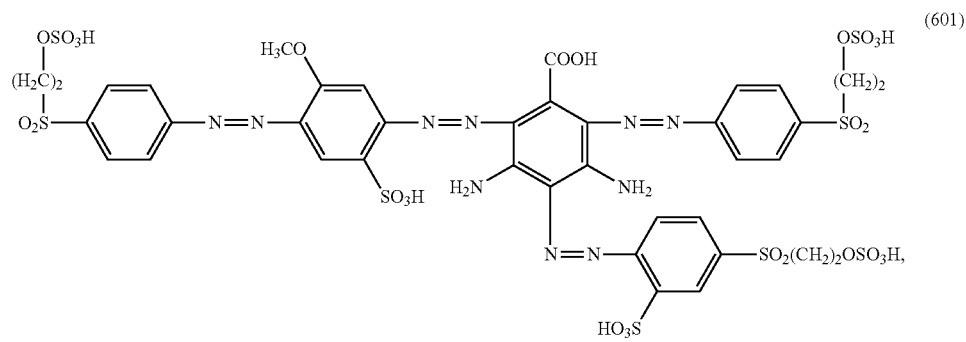

-continued

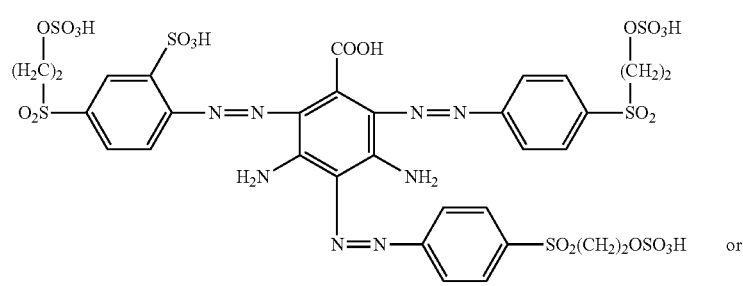
(602)

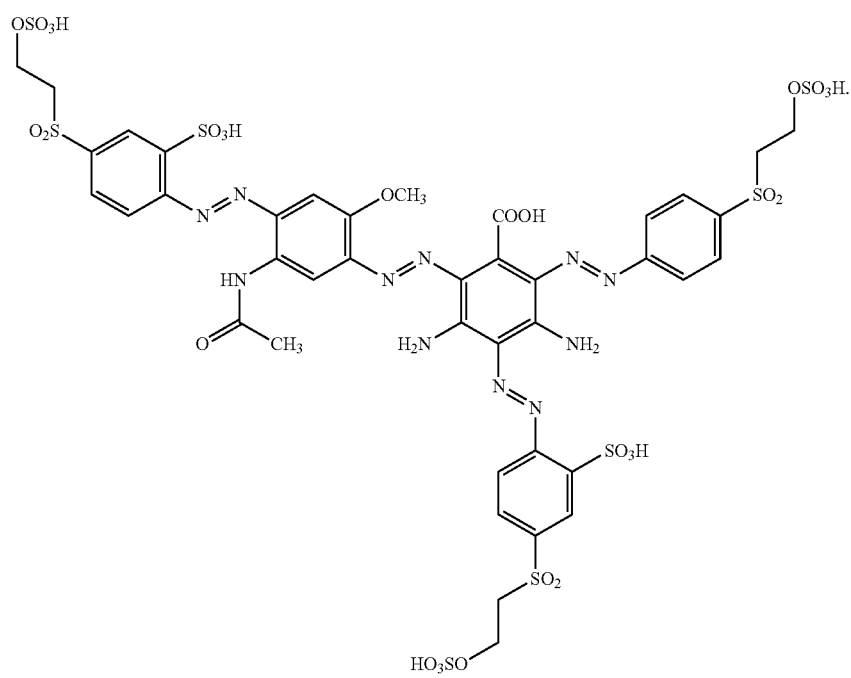
(603)

The dyes of formulae (1), (2), (3), (4), (5) and (6) are known in some cases or they can be prepared in accordance with processes known per se. Dyes of the formula (1) are disclosed, for example, in EP 0 094 055. Dyes of the formula (2) are disclosed, for example, in U.S. Pat. No. 4,622,390 and U.S. Pat. No. 6,458,936. Dyes of the formula (3) are disclosed, for example, in U.S. Pat. No. 5,623,061, US 20080194817 and European Patent Application No 09167920.9. Dyes of the formula (4) are disclosed, for example, in U.S. Pat. No. 4,935,500. Dyes of the formula (5) are disclosed, for example, in U.S. Pat. No. 4,754,023. Dyes of the formula (6) are disclosed, for example, in U.S. Pat. No. 6,160,101.

The dyes of formulae (601) and (603) are novel and represent a further object of the present invention.

The dye mixtures according to the invention can be prepared, for example, by mixing the individual dyes together. The mixing procedure is effected, for example, in suitable mills, e.g. ball mills or pin mills, as well as in kneaders or mixers. The dye mixtures according to the invention can also be prepared, for example, by dissolving the reactive dyes directly in the dyebath or the printing medium. The amount of the individual reactive dyes is governed by the shade to be obtained. The dye of formula (1) and the total amount of the dyes of formulae (2), (3), (4), (5) and (6) are present in the dye mixtures according to the invention in a ratio by weight of, for example, from 1:99 to 99:1, preferably from 5:95 to 95:5 and especially from 10:90 to 90:10.

The reactive dyes of formulae (1), (2), (3), (4), (5) and (6) and accordingly also the dye mixtures according to the invention may comprise further additives, for example, sodium chloride or dextrin.

If desired, the reactive dyes of formulae (1), (2), (3), (4), (5) and (6) and accordingly also the dye mixtures according to the invention may comprise further auxiliaries which, for example, improve handling or increase storage stability, such as buffers, dispersants or anti-dusts. Such auxiliaries are known to the person skilled in the art.

The dye mixtures according to the invention are suitable for the dyeing and printing of an extremely wide variety of materials, especially hydroxy-group-containing or nitrogen-containing fibre materials. Examples thereof are paper, silk, leather, wool, polyamide fibres and polyurethanes as well as, especially, cellulosic fibre materials of all kinds. Such fibre materials are, for example, natural cellulose fibres, such as cotton, linen and hemp, as well as cellulose and regenerated cellulose. The dye mixtures according to the invention and the reactive dyes according to the invention are also suitable for the dyeing or printing of hydroxy-group-containing fibres that are contained in blend fabrics, for example mixtures of cotton with polyester fibres or polyamide fibres.

The said textile fibre material may be in an extremely wide variety of processing forms, such as, for example, in the form of fibres, yarn, woven fabric or knitted fabric.

The present invention relates also to a method for the dichromatic or trichromatic dyeing or printing of hydroxy-group-containing or nitrogen-containing fibre materials, especially cellulosic fibre materials, which method comprises using at least one red dyeing dye, for example one, two or three dyes, preferably one dye, of the above-mentioned formula (1), together with at least one blue, navy, yellow, orange or brown dyeing dye, for example one, two or three dyes, from the group of the above-mentioned formulae (2), (3), (4), (5) and (6), wherein B, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $X_1$, $X_2$, $X_3$, $X_4$, $X_5$, $X_6$, $Y_1$, $Y_2$, $Y_3$, $Y_4$, $Y_5$, $Y_6$, $Y_7$, $Y_8$, $Y_9$, $Z_1$, $Z_2$, $Z_3$, i, j, k, l, m, n, p, u, q, r, s and t each have the meanings and preferred meanings defined above.

Preference is given to corresponding methods for the trichromatic dyeing or printing of hydroxy-group-containing or nitrogen-containing fibre materials, wherein at least one dye of the above-mentioned formula (1) is used together with at least one dye from the group of the formulae (2) and (4) and at least one dye from the group of the formulae (3), (5) and (6), wherein B, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $X_1$, $X_2$, $X_3$, $X_4$, $X_5$, $X_6$, $Y_1$, $Y_2$, $Y_3$, $Y_4$, $Y_5$, $Y_6$, $Y_7$, $Y_8$, $Y_9$, $Z_1$, $Z_2$, $Z_3$, i, j, k, l, m, n, p, u, q, r, s and t each have the meanings and preferred meanings defined above.

In one embodiment of the method for the trichromatic dyeing or printing of hydroxy-group-containing or nitrogen-containing fibre materials, at least one dye of the above-mentioned formula (1) is used together with at least one dye of the above-mentioned formula (2) and together with at least one dye of the above-mentioned formula (3), wherein B, $R_1$, $R_2$, $R_3$, $R_4$, $R_5$, $R_6$, $R_7$, $X_1$, $X_2$, $X_3$, $X_4$, $Y_1$, $Y_2$, $Y_8$, $Y_9$, $Z_1$, $Z_2$, $Z_3$, j, k, l, m, n and p each have the meanings and preferred meanings defined above.

In another embodiment of the method for the trichromatic dyeing or printing of hydroxy-group-containing or nitrogen-containing fibre materials, at least one dye of the above-mentioned formula (1) is used together with at least one dye of the above-mentioned formula (3) and together with at least one dye of the above-mentioned formula (4), wherein B, $R_1$, $R_2$, $R_5$, $R_6$, $R_7$, $R_8$, $R_9$, $X_1$, $X_3$, $X_4$, $X_5$, $Y_1$, $Y_3$, $Y_8$, $Y_9$, $Z_1$, $Z_3$, j, k, n, p, r, s and t each have the meanings and preferred meanings defined above.

The method according to the invention for dichromatic or trichromatic dyeing and printing can be carried out in accordance with customary dyeing and printing methods, for example, according to the so-called cold pad-batch process, in which the dye is applied, together with the alkali, on the padder and is then fixed by storage for several hours at about room temperature, for example, from 25 to 35° C. Preferably, the method according to the invention for dichromatic or trichromatic dyeing and printing is carried out according to the exhaust-dyeing method, in which the goods are impregnated with aqueous, optionally salt-containing dye solutions, and the dyes are fixed after an alkali treatment or in the presence of alkali, optionally under the action of heat.

The dye liquors or print pastes, in addition to containing water and the dyes, may also comprise further additives, for example shading dyes known per se, salts, buffer substances, wetting agents, anti-foams, levelling agents or agents that influence the properties of the textile material, for example, softeners, additives for flame-resistant finishes or dirt-, water- or oil-repellants, as well as water-softeners and natural or synthetic thickeners, e.g. alginates or cellulose ethers.

The amounts in which the individual dyes are used in the dyebaths or print pastes can vary within wide limits in dependence upon the desired depth of shade; in general, amounts of from 0.01 to 15% by weight, especially from 0.1 to 10% by weight, based on the goods being dyed or on the print paste, have proved advantageous.

The dyes of formulae (1), (2), (3), (4), (5) and (6) used in the method according to the invention are distinguished in dichromatic or trichromatic dyeing or printing by uniform colour build-up, good exhaustion and fixing behaviour, good constancy of shade even in different concentrations, a low sensitivity to various dyeing parameters and, in particular, very good combinability. Dyeing times can be reduced. Furthermore, they have sufficient substantivity and at the same time have good ease of washing off of unfixed dye and can advantageously be applied at short liquor ratios, for example, at a liquor ratio of from 1:4 to 1:6, preferably, 1:6. The dyeings and prints produced in accordance with the method of the invention exhibit very good fastness properties, such as wash and water fastness and perspiration fastness, and good reproducibility.

Preferred are dichromatic or trichromatic dyeing methods.

Advantageously, the dyed fibres obtained in accordance with the inventive dichromatic or trichromatic method are subjected to a wash treatment with an aqueous liquor containing a composition comprising (a) a homo- or copolymer obtainable by polymerisation of at least one ethylenically unsaturated nitrogen-containing heterocyclic compound and (b) a polyethyleneimine.

Preferably, the wash treatment is carried out by an exhaust process. The liquor ratio can be chosen from within a wide range and is typically from 1:4 to 1:40 and, preferably, from 1:5 to 1:20.

Special appliances are not required. It is possible to use, for example, the customary dyeing apparatus, e.g. open baths, winch becks, jiggers, or paddle jet or circulation apparatus.

Processing is conveniently carried out in the temperature range from e.g. 40 to 80° C. and, preferably, from 50 to 70° C., for example, at 60° C. The treatment time may typically be from 20 to 100 minutes and, preferably, from 30 to 60 minutes. The pH of the liquor is usually in the range from 8 to 13 and, preferably, from 9 to 11.

The homopolymers suitable as component (a) of the compositions can typically be prepared by polymerising an ethylenically unsaturated nitrogen-containing heterocyclic compound in suitable manner.

Ethylenically unsaturated nitrogen-containing heterocycles suitable for the preparation of the homo- or copolymers according to component (a) are, for example, pyrrole, pyrrolidine, pyridine, quinoline, isoquinoline, purine, pyrazole, imidazole, triazole, tetrazole, indolizine, pyridazine, pyrimidine, pyrazine, indole, isoindole, oxazole, oxazolidone, oxazolidine, morpholine, piperazine, piperidine, isoxazole, thiazole, isothiazole, indoxyle, isatine, dioxindole and hydanthoines as well as derivatives thereof.

Copolymers suitable as component (a) of the composition described above can be prepared by polymerising an unsaturated nitrogen-containing heterocycle in the presence of at least one further copolymerisable monomer.

A further copolymerisable monomer can be another nitrogen-containing heterocycle or another unsaturated compound like, for instance, vinyl amine, allyamine, acrylic acid, methacrylic acid, methyl acrylate, methyl methacrylate, vinyl acetate, acrylamide and methacrylamide.

The preparation of the polymers can be carried out in a manner known per se, e.g. by ionically or, preferably, radically initiated polymerisation of the corresponding monomers e.g. in solution suspension or emulsion. Preferably, this polymerisation is carried out in solution with a peroxide, persulfate or an azo compound, like $K_2S_2O_8$ or azo-(bis)-isobutyronitrile, as radical chain starter, which may be present e.g. in an amount of 0.005 to 10% by weight, based on the monomers used.

Preferably, the composition described above contains as component (a) a polymer obtainable by homopolymerisation of N-vinylpyrrolidone or copolymerisation of N-vinylimidazole and N-vinylpyrrolidone.

Especially preferred as component (a) are polymers, in particular copolymers obtainable by polymerising 60 to 100 mol-%, preferably 70 to 90 mol-%, of N-vinylpyrrolidone and 0 to 40 mol-%, preferably 10 to 30 mol-%, of N-vinylimidazole.

Independently of the liquor ratio, the homopolymers or copolymer according to component (a) is typically used in an amount of 0.01 to 4.0% by weight, preferably of 0.02 to 2.0% by weight and, particularly preferably, of 0.8 to 2.5% by weight of active content, based on the weight of the textile material.

The polyethylenimines suitable as component (b) can likewise be prepared according to known methods.

Pure polyethyleneimine (PEI) having a molecular weight $M_w$ (weight average) from about 200 g/mol to about 5,000,000 g/mol is generated by acid-catalysed ring-opening polyaddition of the highly reactive aziridine.

The branched polymer obtained by this method has primary, secondary and tertiary amino groups and can be modified, for example by reaction with carboxylic acids or carboxylic acid derivatives like chlorides, esters, anhydrides or amides, whereupon partially amidated PEIs are formed.

Further modified polyethyleneimines can be prepared by reaction of PEI with alkylene oxides, like ethylene oxide or propylene oxide, thus generating partially ethoxylated or propoxylated polyethyleneimine.

Such pure or modified PEIs are commercially available, for example under the designation Lupasol® (supplied by BASF) or Epomin® (supplied by Nippon Shokubai).

Preferably the compositions contain a modified polyethyleneimine as component (b), in particular a partially amidated or a partially alkoxylated polyethyleneimine.

In a further preferred embodiment, the compositions contain as component (b) a partially amidated polyethyleneimine obtainable by reaction of a polyethyleneimine with a carboxylic acid, anhydride, ester, chloride or amide.

In a further preferred embodiment, the composition described above contain as component (b) a partially ethoxylated polyethyleneimine obtainable by reaction of a polyethyleneimine with ethylene oxide.

Independently of the liquor ratio, the PEI according to component (b) is typically used in an amount of 0.01 to 4.0% by weight, preferably of 0.05 to 2.0% by weight and, particularly preferably, of 0.1 to 0.25% by weight of active content, based on the weight of the textile material.

The ratio of the amounts of components (a) and (b) can vary within wide limits. Preferably the amount of component (a) is 20 to 80% by weight, more preferably 30 to 70% by weight, particularly preferred 40 to 60% by weight, based on the total weight of components (a)+(b).

Correspondingly, the amount of component (b) is 20 to 80% by weight, more preferably 30 to 70% by weight, particularly preferred 40 to 60% by weight, based on the total weight of components (a)+(b).

Accordingly, a further object of the present invention is a process for washing a printed or dyed textile material, preferably cellulosic textile fibre material, obtained according to the inventive dichromatic or trichromatic method, which process comprises treating said printed or dyed textile material with an aqueous liquor containing a composition as described above.

The wash process is preferably carried out by first dyeing or printing the cellulosic textile fibre material and then treating it with a fresh aqueous liquor containing the composition comprising components (a) and (b) in the amount indicated above. In a particular embodiment, the dyed or printed textile fibre material is rinsed once in a bath containing fresh water immediately after the dyeing or printing process and prior to the treatment with the aqueous liquor containing the composition described above. In another particular embodiment, the dyed or printed textile fibre material is additionally rinsed once or twice, preferably once, in a bath containing fresh water immediately after treatment with the aqueous liquor containing the composition described above. Rinsing in the bath containing fresh water is conveniently carried out in the temperature range from e.g. 40 to 80° C. and, preferably, from 50 to 70° C., for example, at 60° C. The dyed or printed fibre material can then be dehydrated and dried in customary manner.

The wash process with an aqueous liquor containing the composition comprising components (a) and (b) is described in European Patent Application No 09167829.2, which content is hereby incorporated by reference.

The dichromatic or trichromatic dyeing or printing method according to the invention allow for considerable savings of resources, such as water and energy. The time required for dyeing or printing is considerably reduced.

The dye mixtures according to the invention are also suitable as colorants for use in recording systems. Such recording systems are, for example, commercially available ink-jet printers for paper or textile printing, or writing implements, such as fountain pens or ballpoint pens, and especially ink-jet printers. For that purpose, the dye mixture according to the invention or the dyes according to the invention are first converted into a form suitable for use in recording systems. A suitable form is, for example, an aqueous ink comprising at least one dye of the mixture according to the invention or the dyes according to the invention as colorant. The inks can be prepared in customary manner by mixing together the individual constituents customary in ink-jet printing in the desired amount of water. Conveniently, individual inks, comprising at least one dye of formulae (1), (2), (3), (4), (5) and (6), are used in a multi color ink-jet printer and mixing is effected on the substrate by digital printing. For example, one ink comprises a dye of formula (1). Another ink comprises a dye of formula (2) and still another ink comprises a dye of formula (3).

Examples of substrates that come into consideration for ink-jet printing, in addition to paper or plastics films, include the above-mentioned hydroxy-group-containing or nitrogen-containing fibre materials, especially cellulosic fibre materials. The substrates are preferably textile fibre materials.

The following Examples serve to illustrate the invention. Unless otherwise indicated, temperatures are given in degrees Celsius, parts are parts by weight and percentages relate to percent by weight. Parts by weight relate to parts by volume in a ratio of kilograms to liters.

SYNTHESIS EXAMPLE 1 a) $1^{st}$ Coupling 126.6 g (0.45 mol) of 4-(2-sulfatoethylsulfonyl)-aniline are introduced into 700 ml water and the mixture is stirred thoroughly. First 56 ml of a 32% hydrochloric acid and then 100 ml of a 4N sodium nitrite solution are added within 10 min to the suspension at 10° C. After warming up to room temperature (RT) further 15 ml of a 4N sodium nitrite solution are added. The mixture is stirred for 30 min and the excess nitrite is destroyed by addition of 2.0 ml of 10% sulfamic acid.

91.4 g (0.45 mol) of 2-sulfo-5-methoxyaniline are introduced into 700 ml water under vigorous stirring. 4.0 g of sodium hydrogencarbonate, 44.2 ml of 30% NaOH and 350 g of ice are added. Subsequently, the dispersion of the diazonium salt is added within 30 min at 0-5° C., while pH 5 is kept by addition of NaOH. After warming up to room temperature the mixture is stirred 2 h, then pH is lowered to 1.0-1.5 by addition of 70 ml of 32% hydrochloric acid. The resulting suspension is stirred at RT for 30 min. Subsequently, 300 g ice are added and pH is increased to 5.0 by addition of 74.4 ml of 30% NaOH.

b) $2^{nd}$ Coupling

The suspension of the diazo compound obtained in step a) is cooled down to 5-10° C. by addition of 300 g ice. Within 40 min 120 ml 32% hydrochloric acid and 112 ml of a 4N sodium nitrite solution are added. The mixture is stirred for 30 min and the excess nitrite is destroyed by addition of 2.0 ml of 10% sulfamic acid. The suspension of the diazonium salt is cooled down to 5° C. by addition of 600 g ice. A solution of 60.9 g (0.40 mol) of 3,5-diaminobenzoic acid are dissolved in 500 ml water and 44 ml 32% hydrochloric acid is added within 10 min. Subsequently, 322 ml of a 20% sodium carbonate solution are added within 4 h, pH=3.9.

c) $3^{rd}$ Coupling 171 g (0.47 mol) of 2-sulfo-4-(2-sulfatoethylsulfonyl)-aniline are introduced into 800 ml water and the mixture is stirred thoroughly. First 85 ml of a 32% hydrochloric acid and then 100 ml of a 4N sodium nitrite solution are added within 10 min to the suspension at 10° C. After warming up to room temperature (RT) further 19 ml of a 4N sodium nitrite solution are added. The mixture is stirred for 30 min and the excess nitrite is destroyed by addition of 2.0 ml of 10% sulfamic acid.

The suspension prepared in step b) is cooled down to 10° C. by addition of 400 g ice and the suspension of the diazonium salt is added within 35 min. Subsequently, 318 ml of a 20% sodium carbonate solution are added within 4 h, pH=7.0.

d) $4^{th}$ Coupling

The suspension prepared in step c) is cooled down to 10° C. by addition of ice and a suspension containing 0.4 mol of the diazonium salt prepared from 4-(2-sulfatoethylsulfonyl)-aniline as described in step a) is added within 20 min. Subsequently, 147 ml of a 20% sodium carbonate solution are added within 90 min, pH=6.7.

The crude solution is filtered and spray-dried.

The resulting powder consists of the dye of the formula

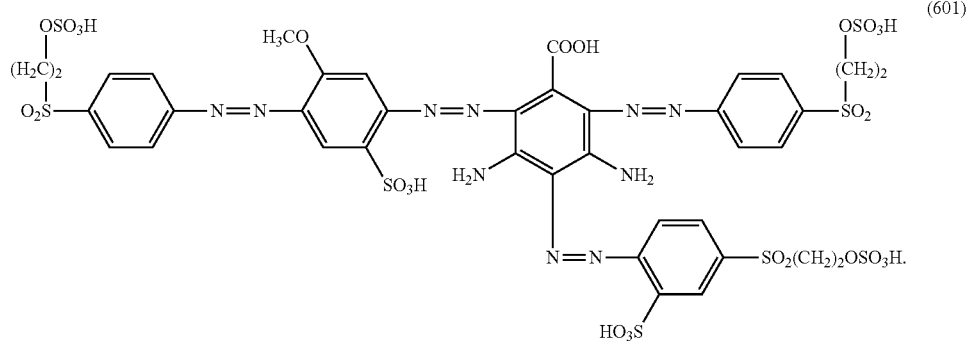

$\lambda_{max1}$ = 438 nm
$\lambda_{max1}$ = 536 nm
($\lambda_{max}$ = wavelength of the absorption maximum)

SYNTHESIS EXAMPLE 2

As described in Synthesis Example 1, the dye of the formula (603) is prepared from 2-sulfo-4-(2-sulfatoethylsulfonyl)-aniline, 3-amino-4-methoxyacetanilide, 3,5-diaminobenzoic acid, 2-sulfo-4-(2-sulfatoethylsulfonyl)-aniline and 4-(2-sulfatoethylsulfonyl)-aniline:

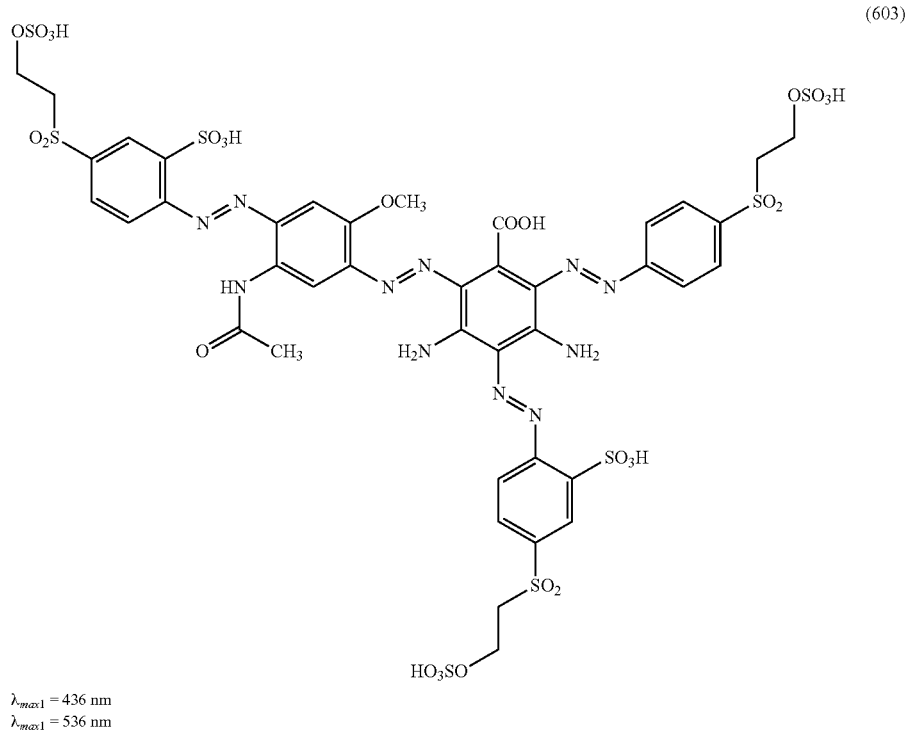

$\lambda_{max1}$ = 436 nm
$\lambda_{max1}$ = 536 nm

APPLICATION EXAMPLE 1

A cotton tricot fabric is introduced at 60° C. into an aqueous dyebath with a liquor ratio of 1:6 which contains 40 g/l of sodium chloride, 0.58% of the red dyeing reactive dye of formula (104), 0.33% of the navy dyeing reactive dye of formula (202) and 0.54% of the yellow dyeing reactive dye of formula (302). After 30 minutes at 60° C. 5.0 g/l of calcined sodium carbonate and 2.0% of sodium hydroxide 36° Bé are added to the dyebath. Dyeing is continued for 30 minutes. The dyed fabric is taken out of the dyeing liquor and submitted to an afterclearing treatment by first rinsing the fabric in a water bath for 10 minutes at 60° C. Afterwards, the fabric is treated for 10 minutes at 60° C. with an afterclearing composition comprising 2 g/l of an aqueous solution containing 10% by weight of a N-vinylimidazole/N-vinylpyrrolidone-copolymer, prepared from 20 mol-% of N-vinylimidazole and 80 mol-% of N-vinylpyrrolidone, and 0.5 g/l of an aqueous solution containing 50% by weight of a modified branched PEI having a molecular weight (weight average) Mw=750,000 g/mol, pH=11. Subsequently, the fabric is rinsed one or two times in a water bath, each time for 10 minutes at 60° C. A brown shaded fabric with a colour depth of 1/1 SD (standard depth according to ISO 105-A-1984 (E)) is obtained.

COMPARATIVE APPLICATION EXAMPLE 1

A cotton tricot fabric is introduced at 60° C. into an aqueous dyebath with a liquor ratio of 1:6 which contains 40 g/l of sodium chloride, 0.66% of the red dyeing reactive dye of formula

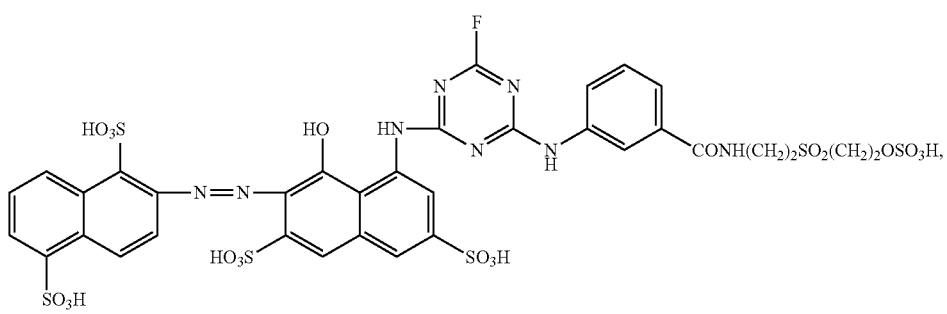

0.27% of the navy dyeing reactive dye of formula

-continued

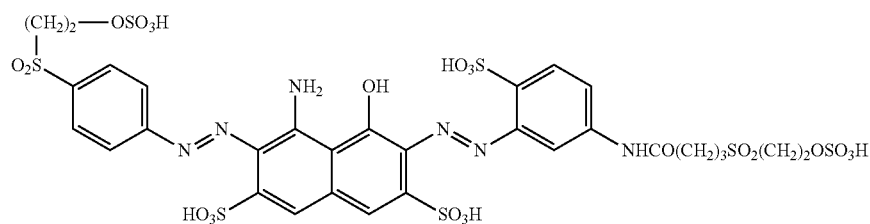
(8)

and 1.28% of the yellow dyeing reactive dye of formula

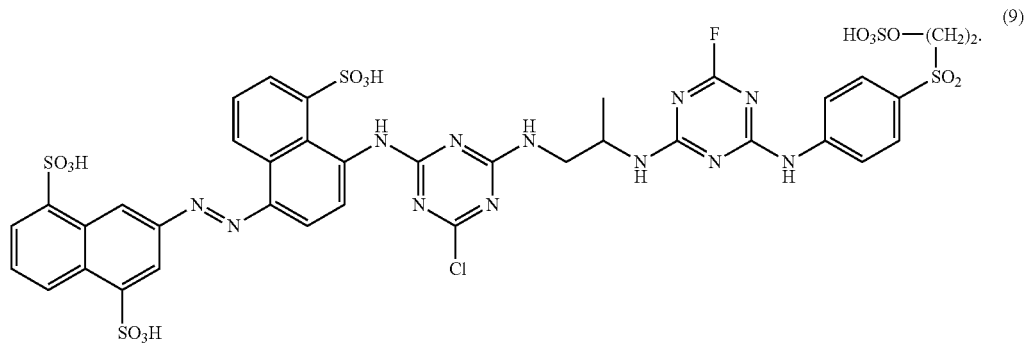
(9)

After 30 minutes at 60° C. 5.0 g/l of calcined sodium carbonate and 2.0% of sodium hydroxide 36° Bé are added to the dyebath. Dyeing is continued for 30 minutes. The dyed fabric is taken out of the dyeing liquor and submitted to an afterclearing treatment as given in Example 1. A brown shaded fabric with a colour depth of 1/1 SD (standard depth according to ISO 105-A-1984 (E)) is obtained as in Application Example 1.

The fabrics obtained in accordance with Application Example 1 and Comparative Application Example 1 are subjected to the following colour fastness tests:

Wash at 60° C. according to ISO 105-C60, C1S (multi fibre strip)

Water severe according to ISO 105-E07

Perspiration acid and alkaline according to ISO 105-E04

Changes in colour are determined according to the Grey Scale. Higher ratings indicate superior fastness properties. The results in Table 1 demonstrate that the dyed fabrics obtained in accordance with the inventive process of Application Example 1 exhibit improved fastness properties, when compared to the dyed fabrics obtained in accordance with the state of the art trichromatic system of Comparative Application Example 1.

TABLE 1

| Fastness | Wash 60° C.[1] | | Water severe[2] | | Perspiration alk.[3] | | Perspiration acid[4] | |
|---|---|---|---|---|---|---|---|---|
| Wash[5] | 3× | 4× | 3× | 4× | 3× | 4× | 3× | 4× |
| Appl. Ex. 1 | 4.5 | 4.5 | 4 | 4.5 | 3.5 | 4 | 3.5 | 4.5 |
| Comp. Ex. 1 | 4 | 4.5 | 3 | 4 | 2.5 | 4 | 2.5 | 3.5 |

[1] Wash at 60° C. according to ISO 105-C60, C1S (multi fibre strip)
[2] Water severe according to ISO 105-E07
[3] Perspiration alkaline according to ISO 105-E04
[4] Perspiration acid according to ISO 105-E04
5) Afterclearing treatment (3× or 4×): 1× water, 1× afterclearing composition and 1× or 2× water; all at 60° C.

Degrees of exhaustion are determined in the usual way by measuring photospectrometrically the residual dyestuff concentration of each dye in the dyebath after dyeing. The fixation rate, i.e. the amount of dyestuff which is covalently bound to the fabric, is obtained from the difference of the total dyestuff uptake (exhaustion onto the fibre) and the amount of dyestuff which is extracted from the dyed fabric into the collected washing liquors. Exhaustion and fixation rates which were improved in the case of the dyes used in accordance with the inventive process are given in Table 2.

TABLE 2

Exhaustion and Fixation

| | Dye of formula | | | | | |
|---|---|---|---|---|---|---|
| | (104) Red | (7) Red | (202) Navy | (8) Navy | (302) Yellow | (9) Yellow |
| Exhaustion [%] | 91 | 84 | 85 | 83 | 87 | 80 |
| Fixation [%] | 86 | 72 | 80 | 77 | 78 | 65 |

APPLICATION EXAMPLE 2

A cotton tricot fabric is introduced at 60° C. into an aqueous dyebath with a liquor ratio of 1:6 which contains 60 g/l of sodium chloride, 1.15% of the red dyeing reactive dye of formula (104), 0.67% of the navy dyeing reactive dye of formula (202) and 1.10% of the yellow dyeing reactive dye of formula (302). After 30 minutes at 60° C. 5.0 g/l of calcined sodium carbonate and 3.0% of sodium hydroxide 36° Bé are added to the dyebath. Dyeing is continued for 30 minutes. The dyed fabric is taken out of the dyeing liquor and submitted to an afterclearing treatment as given in Example 1. A brown shaded fabric with a colour depth of 2/1 SD (standard depth according to ISO 105-A-1984 (E)) is obtained.

COMPARATIVE APPLICATION EXAMPLE 2

A cotton tricot fabric is introduced at 60° C. into an aqueous dyebath with a liquor ratio of 1:6 which contains 60 g/l of sodium chloride, 1.32% of the red dyeing reactive dye of formula (7), 0.54% of the navy dyeing reactive dye of formula (8) and 2.70% of the yellow dyeing reactive dye of formula (9). After 30 minutes at 60° C. 5.0 g/l of calcined sodium carbonate and 3.0% of sodium hydroxide 36° Bé are added to the dyebath. Dyeing is continued for 30 minutes. The dyed fabric is taken out of the dyeing liquor and submitted to an afterclearing treatment as given in Example 1. A brown shaded fabric with a colour depth of 2/1 SD (standard depth according to ISO 105-A-1984 (E)) is obtained as in Application Example 2.

The fabrics obtained in accordance with Example 2 and Comparative Application Example 2 are subjected to the following colour fastness tests:
Wash at 60° C. according to ISO 105-C60, C1S (multi fibre strip)
Water severe according to ISO 105-E07 Perspiration acid and alkaline according to ISO 105-E04
Changes in colour are determined according to the Grey Scale. Higher ratings indicate superior fastness properties. The results in Table 3 demonstrate that the dyed fabrics obtained in accordance with the inventive process of Application Example 2 exhibit improved fastness properties, when compared to the dyed fabrics obtained in accordance with the state of the art trichromatic system of Comparative Application Example 2.

TABLE 3

| | Fastness properties | | | | | | | |
|---|---|---|---|---|---|---|---|---|
| | Wash 60° C.[1] | | Water severe[2] | | Perspiration alk.[3] | | Perspiration acid[4] | |
| Wash[5] | 3× | 4× | 3× | 4× | 3× | 4× | 3× | 4× |
| Appl. Ex. 2 | 4 | 4.5 | 3 | 4 | 3 | 3.5 | 3 | 3.5 |
| Comp. Ex. 2 | 3.5 | 4 | 2.5 | 3.5 | 2 | 3 | 2 | 3 |

[1] Wash at 60° C. according to ISO 105-C60, C1S (multi fibre strip)
[2] Water severe according to ISO 105-E07
[3] Perspiration alkaline according to ISO 105-E04
[4] Perspiration acid according to ISO 105-E04
[5] Afterclearing treatment (3× or 4×): 1× water, 1× afterclearing composition and 1× or 2× water; all at 60° C.

APPLICATION EXAMPLE 3

A cotton tricot fabric is introduced at 60° C. into an aqueous dyebath with a liquor ratio of 1:6 which contains 40 g/l of sodium chloride, 1.15% of the red dyeing reactive dye of formula (104), 0.33% of the navy dyeing reactive dye of formula (202) and 0.27% of the yellow dyeing reactive dye of formula (302). After 30 minutes at 60° C. 5.0 g/l of calcined sodium carbonate and 2.0% of sodium hydroxide 36° Bé are added to the dyebath. Dyeing is continued for 30 minutes. The dyed fabric is taken out of the dyeing liquor and submitted to an afterclearing treatment as given in Example 1. A bordeaux shaded fabric with a colour depth of 1/1 SD (standard depth according to ISO 105-A-1984 (E)) is obtained.

COMPARATIVE APPLICATION EXAMPLE 3

A cotton tricot fabric is introduced at 60° C. into an aqueous dyebath with a liquor ratio of 1:6 which contains 40 g/l of sodium chloride, 1.32% of the red dyeing reactive dye of formula (7), 0.27% of the navy dyeing reactive dye of formula (8) and 0.64% of the yellow dyeing reactive dye of formula (9). After 30 minutes at 60° C. 5.0 g/l of calcined sodium carbonate and 2.0% of sodium hydroxide 36° Bé are added to the dyebath. Dyeing is continued for 30 minutes. The dyed fabric is taken out of the dyeing liquor and submitted to an afterclearing treatment as given in Example 1. A bordeaux shaded fabric with a colour depth of 1/1 SD (standard depth according to ISO 105-A-1984 (E)) is obtained as in Application Example 3.

The fabrics obtained in accordance with Application Example 3 and Comparative Application Example 3 are subjected to the following colour fastness tests
Wash at 60° C. according to ISO 105-C60, C1S (multi fibre strip)
Water severe according to ISO 105-E07
Perspiration acid and alkaline according to ISO 105-E04
Changes in colour are determined according to the Grey Scale. Higher ratings indicate superior fastness properties. The results in Table 4 demonstrate that the dyed fabrics obtained in accordance with the inventive process of Example 3 exhibit improved fastness properties, when compared to the dyed fabrics obtained in accordance with the state of the art trichromatic system of Comparative Application Example 3.

TABLE 4

| | Fastness properties | | | | | | | |
|---|---|---|---|---|---|---|---|---|
| | Wash 60° C.[1] | | Water severe[2] | | Perspiration alk.[3] | | Perspiration acid[4] | |
| Wash[5] | 3× | 4× | 3× | 4× | 3× | 4× | 3× | 4× |
| Appl. Ex. 3 | 4.5 | 4.5 | 4 | 4.5 | 3 | 4 | 3 | 4 |
| Comp. Ex. 3 | 4 | 4.5 | 2.5 | 3.5 | 2 | 3.5 | 2 | 3 |

[1] Wash at 60° C. according to ISO 105-C60, C1S (multi fibre strip)
[2] Water severe according to ISO 105-E07
[3] Perspiration alkaline according to ISO 105-E04
[4] Perspiration acid according to ISO 105-E04
[5] Afterclearing treatment (3× or 4×): 1× water, 1× afterclearing composition and 1× or 2× water; all at 60° C.

APPLICATION EXAMPLE 4

A cotton tricot fabric is introduced at 60° C. into an aqueous dyebath with a liquor ratio of 1:6 which contains 60 g/l of sodium chloride, 2.40% of the red dyeing reactive dye of formula (104), 0.67% of the navy dyeing reactive dye of formula (202) and 0.54% of the yellow dyeing reactive dye of formula (302). After 30 minutes at 60° C. 5.0 g/l of calcined sodium carbonate and 3.0% of sodium hydroxide 36° Bé are added to the dyebath. Dyeing is continued for 30 minutes. The dyed fabric is taken out of the dyeing liquor and submitted to an afterclearing treatment as given in Example 1. A bordeaux shaded fabric with a colour depth of 2/1 SD (standard depth according to ISO 105-A-1984 (E)) is obtained.

COMPARATIVE APPLICATION EXAMPLE 4

A cotton tricot fabric is introduced at 60° C. into an aqueous dyebath with a liquor ratio of 1:6 which contains 70 g/l of sodium chloride, 2.60% of the red dyeing reactive dye of formula (7), 0.54% of the navy dyeing reactive dye of formula (8) and 1.26% of the yellow dyeing reactive dye of formula (9). After 30 minutes at 60° C. 5.0 g/l of calcined sodium carbonate and 3.5% of sodium hydroxide 36° Bé are added to the dyebath. Dyeing is continued for 30 minutes. The dyed fabric is taken out of the dyeing liquor and submitted to an afterclearing treatment as given in Example 1. A bordeaux shaded fabric with a colour depth of 2/1 SD (standard depth according to ISO 105-A-1984 (E)) is obtained as in Application Example 4.

The fabrics obtained in accordance with Example 4 and Comparative Application Example 4 are subjected to the following colour fastness tests:

Wash at 60° C. according to ISO 105-C60, C1S (multi fibre strip)
Water severe according to ISO 105-E07
Perspiration acid and alkaline according to ISO 105-E04

Changes in colour are determined according to the Grey Scale. Higher ratings indicate superior fastness properties. The results in Table 5 demonstrate that the dyed fabrics obtained in accordance with the inventive process of Application Example 4 exhibit improved fastness properties, when compared to the dyed fabrics obtained in accordance with the state of the art trichromatic system of Comparative Application Example 4.

TABLE 5

| | Fastness properties | | | | | | | |
|---|---|---|---|---|---|---|---|---|
| | Wash 60° C.[1)] | | Water severe[2)] | | Perspiration alk.[3)] | | Perspiration acid[4)] | |
| Wash[5)] | 3× | 4× | 3× | 4× | 3× | 4× | 3× | 4× |
| Appl. Ex. 4 | 3.5 | 4 | 2.5 | 4 | 2.5 | 3.5 | 2.5 | 3.5 |
| Comp. Ex. 4 | 3 | 4 | 2 | 3 | 1.5 | 2.5 | 1.5 | 2.5 |

[1)]Wash at 60° C. according to ISO 105-C60, C1S (multi fibre strip)
[2)]Water severe according to ISO 105-E07
[3)]Perspiration alkaline according to ISO 105-E04
[4)]Perspiration acid according to ISO 105-E04
[5)] Afterclearing treatment (3× or 4×): 1× water, 1× afterclearing composition and 1× or 2× water; all at 60° C.

APPLICATION EXAMPLE 5

A cotton tricot fabric is introduced at 60° C. into an aqueous dyebath with a liquor ratio of 1:6 which contains 40 g/l of sodium chloride, 0.58% of the red dyeing reactive dye of formula (104), 0.67% of the navy dyeing reactive dye of formula (202) and 0.27% of the yellow dyeing reactive dye of formula (302). After 30 minutes at 60° C. 5.0 g/l of calcined sodium carbonate and 2.0% of sodium hydroxide 36° Bé are added to the dyebath. Dyeing is continued for 30 minutes. The dyed fabric is taken out of the dyeing liquor and submitted to an afterclearing treatment as given in Example 1. A navy shaded fabric with a colour depth of 1/1 SD (standard depth according to ISO 105-A-1984 (E)) is obtained.

COMPARATIVE APPLICATION EXAMPLE 5

A cotton tricot fabric is introduced at 60° C. into an aqueous dyebath with a liquor ratio of 1:6 which contains 40 g/l of sodium chloride, 0.66% of the red dyeing reactive dye of formula (7), 0.54% of the navy dyeing reactive dye of formula (8) and 0.64% of the yellow dyeing reactive dye of formula (9). After 30 minutes at 60° C. 5.0 g/l of calcined sodium carbonate and 2.0% of sodium hydroxide 36° Bé are added to the dyebath. Dyeing is continued for 30 minutes. The dyed fabric is taken out of the dyeing liquor and submitted to an afterclearing treatment as given in Example 1. A navy shaded fabric with a colour depth of 1/1 SD (standard depth according to ISO 105-A-1984 (E)) is obtained as in Application Example 5.

The fabrics obtained in accordance with Application Example 5 and Comparative Application Example 5 are subjected to the following colour fastness tests:

Wash at 60° C. according to ISO 105-C60, C1S (multi fibre strip)
Water severe according to ISO 105-E07
Perspiration acid and alkaline according to ISO 105-E04

Changes in colour are determined according to the Grey Scale. Higher ratings indicate superior fastness properties. The results in Table 6 demonstrate that the dyed fabrics obtained in accordance with the inventive process of Application Example 5 exhibit improved fastness properties, when compared to the dyed fabrics obtained in accordance with the state of the art trichromatic system of Comparative Application Example 5.

TABLE 6

| | Fastness properties | | | | | | | |
|---|---|---|---|---|---|---|---|---|
| | Wash 60° C.[1)] | | Water severe[2)] | | Perspiration alk.[3)] | | Perspiration acid[4)] | |
| Wash[5)] | 3× | 4× | 3× | 4× | 3× | 4× | 3× | 4× |
| Appl. Ex. 5 | 4 | 4.5 | 4 | 4.5 | 3 | 4 | 3.5 | 4.5 |
| Comp. Ex. 5 | 4 | 4.5 | 3 | 4 | 2.5 | 4 | 2.5 | 3.5 |

[1)]Wash at 60° C. according to ISO 105-C60, C1S (multi fibre strip)
[2)]Water severe according to ISO 105-E07
[3)]Perspiration alkaline according to ISO 105-E04
[4)]Perspiration acid according to ISO 105-E04
[5)]Afterclearing treatment (3× or 4×): 1× water, 1× afterclearing composition and 1× or 2× water; all at 60° C.

APPLICATION EXAMPLE 6

A cotton tricot fabric is introduced at 60° C. into an aqueous dyebath with a liquor ratio of 1:6 which contains 60 g/l of sodium chloride, 1.20% of the red dyeing reactive dye of formula (104), 1.40% of the navy dyeing reactive dye of formula (202) and 0.54% of the yellow dyeing reactive dye of formula (302). After 30 minutes at 60° C. 5.0 g/l of calcined sodium carbonate and 3.0% of sodium hydroxide 36° Bé are added to the dyebath. Dyeing is continued for 30 minutes. The dyed fabric is taken out of the dyeing liquor and submitted to an afterclearing treatment as given in Example 1. A navy shaded fabric with a colour depth of 2/1 SD (standard depth according to ISO 105-A-1984 (E)) is obtained.

COMPARATIVE APPLICATION EXAMPLE 6

A cotton tricot fabric is introduced at 60° C. into an aqueous dyebath with a liquor ratio of 1:6 which contains 60 g/l of sodium chloride, 1.30% of the red dyeing reactive dye of formula (7), 1.10% of the navy dyeing reactive dye of formula (8) and 1.28% of the yellow dyeing reactive dye of formula (9). After 30 minutes at 60° C. 5.0 g/l of calcined sodium carbonate and 3.0% of sodium hydroxide 36° Bé are added to the dyebath. Dyeing is continued for 30 minutes. The dyed fabric is taken out of the dyeing liquor and submitted to an afterclearing treatment as given in Application Example 1. A navy shaded fabric with a colour depth of 2/1 SD (standard depth according to ISO 105-A-1984 (E)) is obtained as in Example 6.

The fabrics obtained in accordance with Application Example 6 and Comparative Application Example 6 are subjected to the following colour fastness tests:

Wash at 60° C. according to ISO 105-C60, C1S (multi fibre strip)
Water severe according to ISO 105-E07
Perspiration acid and alkaline according to ISO 105-E04

Changes in colour are determined according to the Grey Scale. Higher ratings indicate superior fastness properties. The results in Table 7 demonstrate that the dyed fabrics obtained in accordance with the inventive process of Application Example 6 exhibit improved fastness properties, when compared to the dyed fabrics obtained in accordance with the state of the art trichromatic system of Comparative Application Example 6.

TABLE 7

| | Fastness properties | | | | | | | |
|---|---|---|---|---|---|---|---|---|
| | Wash 60° C.[1] | | Water severe[2] | | Perspiration alk.[3] | | Perspiration acid[4] | |
| Wash[5] | 3× | 4× | 3× | 4× | 3× | 4× | 3× | 4× |
| Appl. Ex. 6 | 4 | 4.5 | 3 | 4 | 2.5 | 4 | 2.5 | 3.5 |
| Comp. Ex. 6 | 3.5 | 4 | 2.5 | 3.5 | 2 | 2.5 | 2 | 3 |

[1] Wash at 60° C. according to ISO 105-C60, C1S (multi fibre strip)
[2] Water severe according to ISO 105-E07
[3] Perspiration alkaline according to ISO 105-E04
[4] Perspiration acid according to ISO 105-E04
[5] Afterclearing treatment (3× or 4×): 1× water, 1× afterclearing composition and 1× or 2× water; all at 60° C.

What is claimed is:

1. A dye mixture comprising at least one dye of the formula (1a),

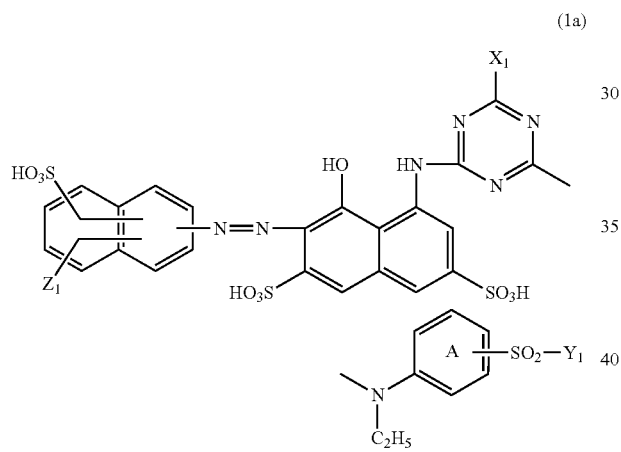

wherein $X_1$ is fluorine or chlorine,
$Z_1$ is a fibre-reactive group of the formula $$-SO_2-Y_8, \quad (7a)$$

or $$-NH-CO-(CH_2)_{2-3}-SO_2-Y_9 \quad (7b),$$

$Y_1$, $Y_8$ and $Y_9$ each independently of the others are β-sulfatoethyl or vinyl, and the radical $-SO_2-Y_1$ is located in the meta-position of the phenyl ring A, at least one dye of the formula (2)

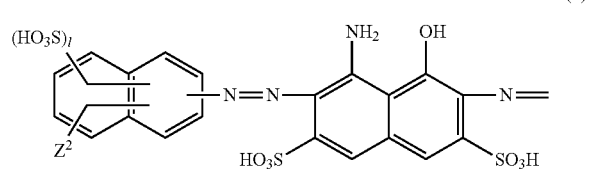

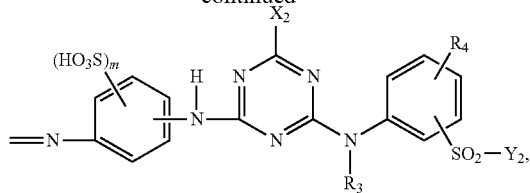

wherein
$R_3$ is hydrogen or $C_1$-$C_4$ alkyl,
$R_4$ is hydrogen, $C_1$-$C_4$ alkyl, $C_1$-$C_4$ alkoxy or sulfo,
l is a number 0, 1 or 2,
m is a number 1 or 2,
$X_2$ is halogen, 3-carboxypyridin-1-yl or 3-carbamoylpyridin-1-yl,
$Z_2$ is a fibre-reactive group of the formula $$-SO_2-Y_8, \quad (7a)$$

or $$-NH-CO-(CH_2)_{2-3}-SO_2-Y_9 \quad (7b),$$

$Y_2$, $Y_8$ and $Y_9$ are each independently of the others vinyl or a radical $-CH_2-CH_2-U$ and U is a group removable under alkaline conditions,
and at least one dye of the formula (3)

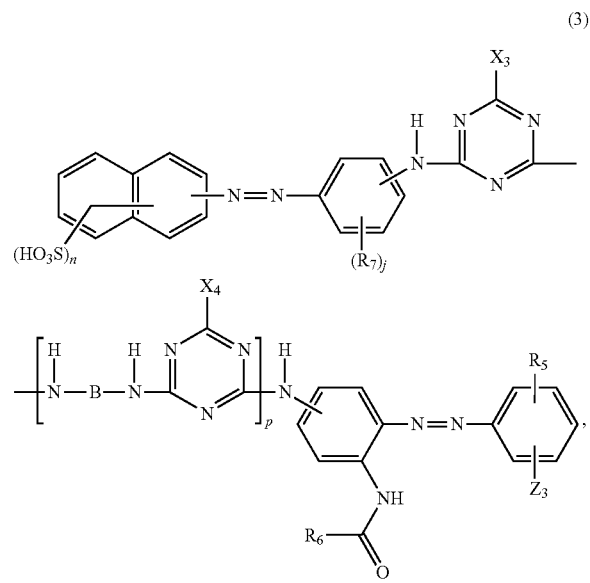

wherein
B is an aliphatic bridging member,
$R_5$ is hydrogen, $C_1$-$C_4$ alkyl, $C_1$-$C_4$ alkoxy or sulfo,
$R_6$ is amino or $C_1$-$C_4$ alkyl,
j is a number 0, 1 or 2,
$(R_7)_j$ denotes j identical or different substituents selected from the group $C_2$-$C_4$ alkanoylamino, ureido, $C_1$-$C_4$ alkyl and $C_1$-$C_4$ alkoxy,
$X_3$ and $X_4$ are each independently of the other halogen, 3-carboxypyridin-1-yl or 3-carbamoylpyridin-1-yl, $Z_3$ is a fibre-reactive group of the formula $$-SO_2-Y_8, \quad (7a)$$

or $$-NH-CO-(CH_2)_{2-3}-SO_2-Y_9 \quad (7b),$$

$Y_8$ and $Y_9$ are each independently of the others vinyl or a radical $-CH_2-CH_2-U$ and U is a group removable under alkaline conditions, n is a number 1, 2 or 3, and p is the number 1.

2. A method for the trichromatic dyeing or printing of hydroxy-group-containing or nitrogen-containing fibre materials which method comprises using at least one dye of the formula (1a)

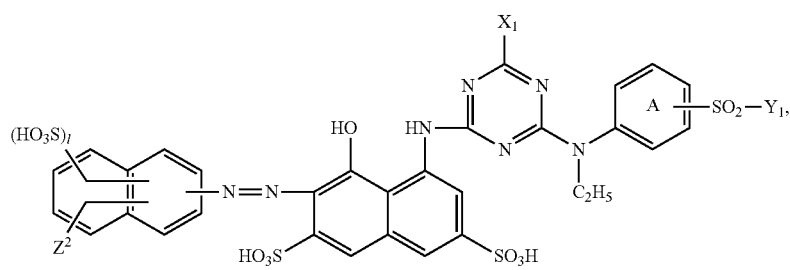
(1a)

wherein $X_1$ is fluorine or chlorine, $Z_1$ is a fibre-reactive group of the formula $$-SO_2-Y_8, \quad (7a)$$

or $$-NH-CO-(CH_2)_{2-3}-SO_2-Y_9 \quad (7b),$$

$Y_1$, $Y_8$ and $Y_9$ each independently of the others are β-sulfatoethyl or vinyl, and the radical $-SO_2-Y_1$ is located in the meta-position of the phenyl ring A, together with at least one dye of the formula (2)

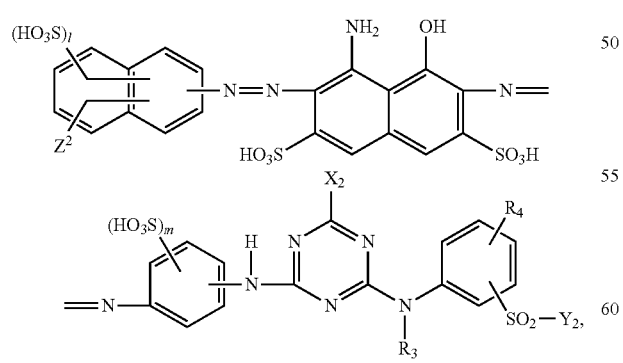
(2)

wherein $R_3$ is hydrogen or $C_1$-$C_4$ alkyl, $R_4$ is hydrogen, $C_1$-$C_4$ alkyl, $C_1$-$C_4$ alkoxy or sulfo, l is a number 0, 1 or 2, m is a number 1 or 2, $X_2$ is halogen, 3-carboxypyridin-1-yl or 3-carbamoylpyridin-1-yl, $Z_2$ is a fibre-reactive group of the formula $$-SO_2-Y_8, \quad (7a)$$

or $$-NH-CO-(CH_2)_{2-3}-SO_2-Y_9 \quad (7b),$$

$Y_2$, $Y_8$ and $Y_9$ are each independently of the others vinyl or a radical $-CH_2-CH_2-U$ and U is a group removable under alkaline conditions, and at least one dye of the formula (3), (3)

[complex structural formula shown]

wherein

B is an aliphatic bridging member, $R_5$ is hydrogen, $C_1$-$C_4$ alkyl, $C_1$-$C_4$ alkoxy or sulfo, $R_6$ is amino or $C_1$-$C_4$ alkyl, j is a number 0, 1 or 2, $(R_7)_j$ denotes j identical or different substituents selected from the group $C_2$-$C_4$ alkanoylamino, ureido, $C_1$-$C_4$ alkyl and $C_1$-$C_4$ alkoxy, $X_3$ and $X_4$ are each independently of the other halogen, 3-carboxypyridin-1-yl or 3-carbamoylpyridin-1-yl, $Z_3$ is a fibre-reactive group of the formula $$-SO_2-Y_8, \quad (7a)$$

or $$-NH-CO-(CH_2)_{2-3}-SO_2-Y_9 \quad (7b),$$

$Y_8$ and $Y_9$ are each independently of the others vinyl or a radical $-CH_2-CH_2-U$ and U is a group removable under alkaline conditions, n is a number 1, 2 or 3, and p is the number 1.

3. A method for the trichromatic dyeing or printing of hydroxy-group-containing or nitrogen-containing fibre materials which method comprises using at least one dye of the formula (1a)

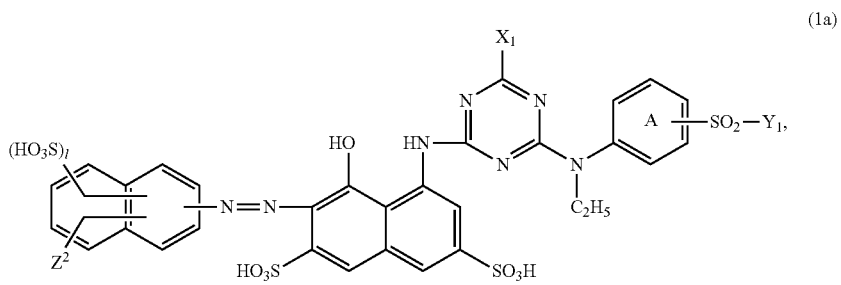

(1a)

wherein $X_1$ is fluorine or chlorine, $Z_1$ is a fibre-reactive group of the formula $$-SO_2-Y_8, \quad (7a)$$

or $$-NH-CO-(CH_2)_{2-3}-SO_2-Y_9 \quad (7b),$$

$Y_1$, $Y_8$ and $Y_9$ each independently of the others are β-sulfatoethyl or vinyl, and the radical $-SO_2-Y_1$ is located in the meta-position of the phenyl ring A, with at least one dye of the formula (3)

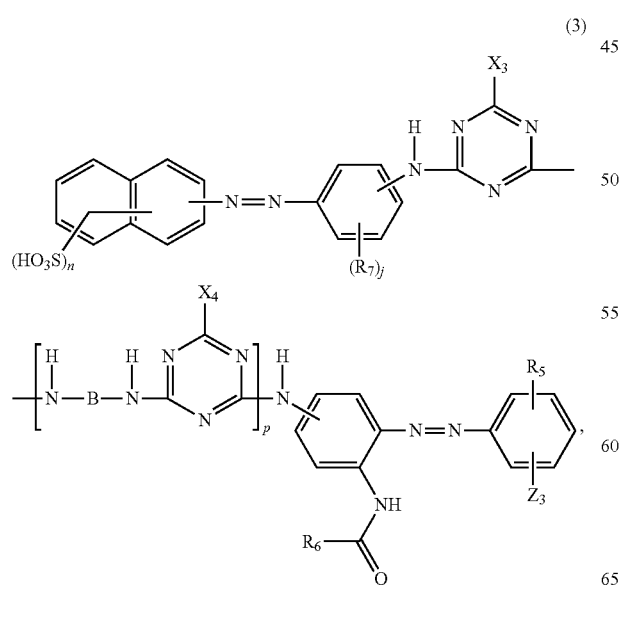

(3)

wherein

B is an aliphatic bridging member, $R_5$ is hydrogen, $C_1$-$C_4$ alkyl, $C_1$-$C_4$ alkoxy or sulfo, $R_6$ is amino or $C_1$-$C_4$ j is a number 0, 1 or 2, $(R_7)_j$ denotes j identical or different substituents selected from the group $C_2$-$C_4$ alkanoylamino, ureido, $C_1$-$C_4$ alkyl and $C_1$-$C_4$ alkoxy, $X_3$ and $X_4$ are each independently of the other halogen, 3-carboxypyridin-1-yl or 3-carbamoylpyridin-1-yl, $Z_3$ is a fibre-reactive group of the formula $$-SO_2-Y_8, \quad (7a)$$

or $$-NH-CO-(CH_2)_{2-3}-SO_2-Y_9 \quad (7b),$$

$Y_8$ and $Y_9$ are each independently of the others vinyl or a radical $-CH_2-CH_2-U$ and U is a group removable under alkaline conditions, n is a number 1, 2 or 3, and p is the number 1, and together with at least one dye of the formula (4),

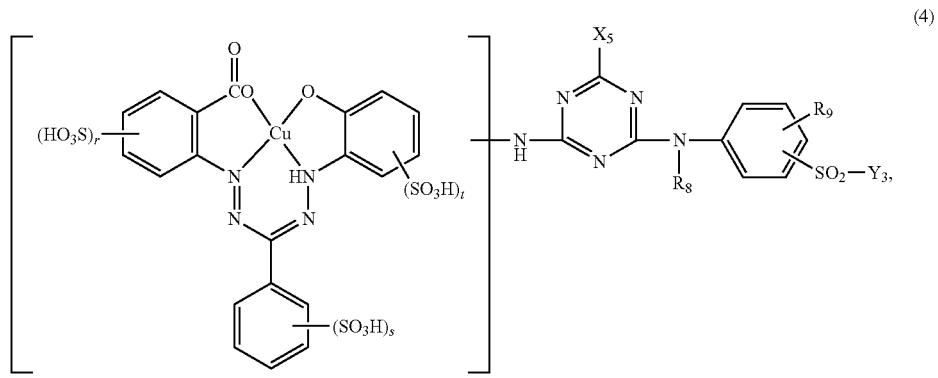

wherein
$R_8$ is hydrogen or $C_1$-$C_4$ alkyl,
$R_9$ is hydrogen, $C_1$-$C_4$ alkyl, $C_1$-$C_4$ alkoxy or sulfo,
$X_5$ is halogen, 3-carboxypyridin-1-yl or 3-carbamoylpyridin-1-yl,
$Y_3$ is vinyl or a radical —$CH_2$—$CH_2$—U and U is a group removable under alkaline conditions, r and s are each independently of the other a number 0 or 1, and t is a number 0, 1 or 2, and the sum of r, s and t is 2 or 3.

* * * * *